United States Patent [19]
Saeki et al.

[11] Patent Number: 6,147,477
[45] Date of Patent: Nov. 14, 2000

[54] DC TO DC CONVERTER PRODUCING OUTPUT VOLTAGE EXHIBITING RISE AND FALL CHARACTERISTICS INDEPENDENT OF LOAD THEREON

[75] Inventors: Mitsuo Saeki; Hidetoshi Yano; Hidekiyo Ozawa; Seiya Kitagawa, all of Kawasaki; Toshiyuki Matsuyama, Kasugai; Takashi Matsumoto, Kasugai; Kyuichi Takimoto, Kasugai; Yoshiaki Sano, Kasugai, all of Japan

[73] Assignee: Fujitsu Limited, Kawasaki, Japan

[21] Appl. No.: 08/884,082

[22] Filed: Jun. 27, 1997

Related U.S. Application Data

[63] Continuation of application No. 08/757,623, Nov. 27, 1996, abandoned.

[30] Foreign Application Priority Data

Nov. 28, 1995 [JP] Japan ................................... 7-308856

[51] Int. Cl.[7] ...................................................... G05F 1/40
[52] U.S. Cl. ............................ 323/273; 323/280; 323/281
[58] Field of Search .................................... 323/273, 274, 323/275, 280, 281, 282, 285, 303, 222; 363/19, 21, 23, 25

[56] References Cited

U.S. PATENT DOCUMENTS

| | | | |
|---|---|---|---|
| 4,504,898 | 3/1985 | Pilukaitis et al. | 363/49 |
| 5,414,341 | 5/1995 | Brown | 323/268 |
| 5,490,055 | 2/1996 | Boylan et al. | 363/41 |
| 5,513,089 | 4/1996 | Sudo et al. | 363/21 |
| 5,572,112 | 11/1996 | Saeki et al. | 323/282 |
| 5,617,016 | 4/1997 | Borghi et al. | 323/284 |
| 5,627,459 | 5/1997 | Itoyama et al. | 323/283 |
| 5,691,631 | 11/1997 | Shimamori et al. | 323/272 |
| 6,046,896 | 4/2000 | Saeki et al. | 361/115 |

FOREIGN PATENT DOCUMENTS

| | | |
|---|---|---|
| 57-132762 | 8/1982 | Japan . |
| 6-217538 | 8/1994 | Japan . |
| 9-117131 | 5/1997 | Japan . |

*Primary Examiner*—Adolf Deneke Berhane
*Attorney, Agent, or Firm*—Staas & Halsey LLP

[57] ABSTRACT

A direct-current to direct-current conversion (DC/DC) apparatus includes a control circuit having an error amplifier for voltage control and controlling a direct-current to direct-current conversion based on a pulse width modulation control using an output of the error amplifier. The error amplifier inputs a voltage signal corresponding to an output voltage of a DC/DC result and a plurality of reference voltage signals. The DC/DC apparatus also includes a soft start capacitor to provide one of the plurality of reference voltage signals. The error amplifier amplifies a difference between the voltage signal corresponding to the output voltage of a DC/DC result and a voltage signal of a lower potential among the plurality of reference voltage signals and, based on the amplified output, carries out the pulse width modulation control. Furthermore, the control circuit includes a circuit for discharging charges corresponding to the output voltage of the DC/DC result when a power supply to the control circuit is turned off. By the constitution, it is possible to easily realize power turn-on/turn-off sequence controls without requiring any special logic circuit, and thus to control rise/fall characteristics of the output voltage without depending on the load.

41 Claims, 24 Drawing Sheets

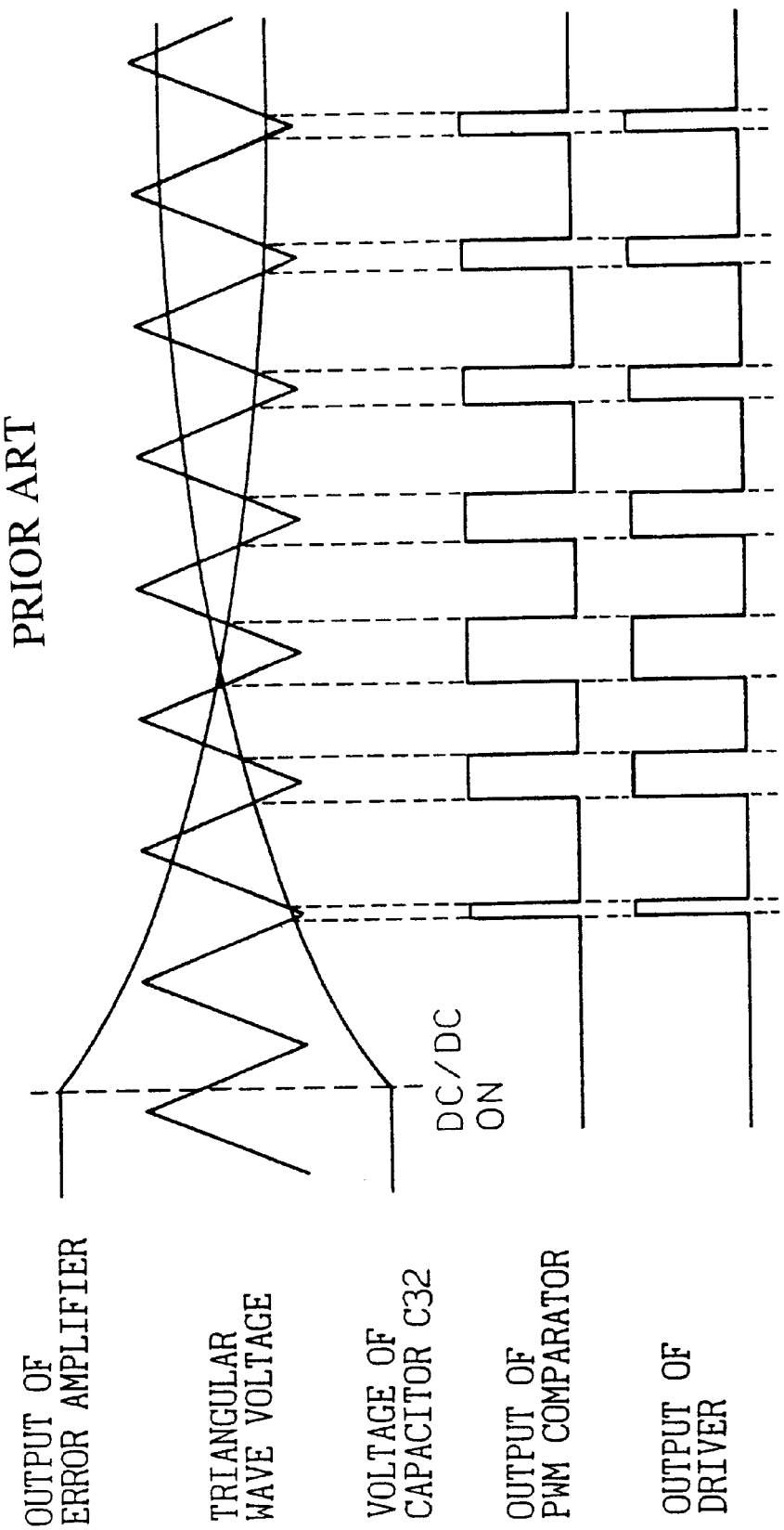

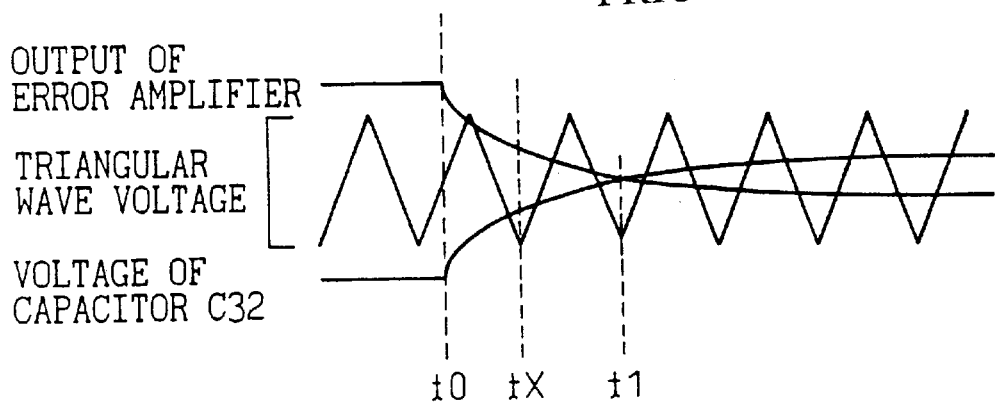
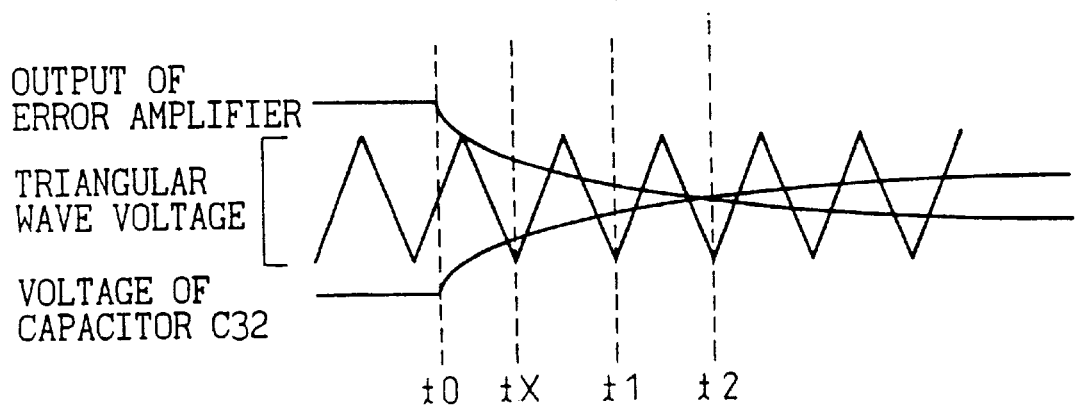

DC TO DC CONVERTER PRODUCING OUTPUT VOLTAGE EXHIBITING RISE AND FALL CHARACTERISTICS INDEPENDENT OF LOAD THEREON

CROSS-REFERENCE TO RELATED APPLICATION

This application is related to application Ser. No. 08/694,581 filed Aug. 9, 1996, which has a single co-inventor in common with the co-inventors of the subject application and which is assigned to the common assignee therewith.

This application is a continuation, of application No. 08/757,623, filed Nov. 27, 1996, now abandoned.

BACKGROUND OF THE INVENTION

1. Field of the Invention

The present invention relates to a power supply circuit used in various kinds of electronic apparatuses. More particularly, it relates to a circuit for controlling a direct-current to direct-current conversion so as to keep constant a voltage or voltages used in an electronic apparatus, and to a direct-current to direct-current conversion apparatus using the same. Note that, in the description below, "direct-current to direct-current conversion" is simply abbreviated as ""DC/DC"".

2. Description of the Related Art

A portable electronic apparatus such as a so-called hand-held type personal computer is equipped with a battery as its power source. Since the voltage of a battery is generally lowered as the battery discharges, a DC/DC apparatus is incorporated into the electronic apparatus so as to keep constant the output voltage of the battery.

On the other hand, the power source used in an electronic apparatus usually requires a plurality of power supplies, not a single power supply. To this end, a plurality of DC/DC apparatuses are provided for the plurality of power supplies. In this case, if turn-on/turn-off sequences between the respective power supplies are not fully taken into consideration, a drawback occurs in that a latch-up phenomenon is caused in semiconductor devices used in the electronic apparatus and thus some devices are burned out. Accordingly, some ideas are required for controlling power turn-on/turn-off sequences.

In one example of the prior art, the DC/DC apparatus is provided with a special logic circuit for controlling such power turn-on/turn-off sequences. However, this leads to a problem in that the scale of the entire circuit becomes large and the circuit constitution also becomes relatively complicated.

Also, where respective power supplies are simultaneously turned on with respect to a plurality of DC/DC apparatuses, it is substantially impossible to control respective rise characteristics of output voltages of the DC/DC apparatuses since the rise characteristics depend on lightness or heaviness of respective loads of the DC/DC apparatuses. A similar problem also occurs in the case where respective power supplies are simultaneously turned off.

The problems encountered in the prior art will be explained later in detail in contrast with preferred embodiments of the present invention.

SUMMARY OF THE INVENTION

An object of the present invention is to provide a DC/DC control circuit and a DC/DC apparatus using the same, by which it is possible to easily realize power turn-on/turn-off sequence controls without requiring any special logic circuit, and thus to control rise/fall characteristics of the output voltage without depending on the load.

To attain the object, the present invention is mainly characterized in that, where power turn-on/turn-off sequences are controlled between a plurality of DC/DC apparatuses (e.g., DC/DC apparatuses using a pulse width modulation (PWM) control), a plurality of reference voltages can be input to an error amplifier for voltage control provided in each DC/DC apparatus, and the rise characteristics of an output voltage obtained when the power supply to each DC/DC apparatus is turned on do not depend on the corresponding load.

Namely, the present invention is directed to devising the form of connection of a capacitor circuit for use in a soft start of the DC/DC apparatus, to thereby control the rise characteristics of the output voltage without depending on the load. Note that the explanation as to the "soft start" will be given later.

In the prior art, a design for the soft start control is made under the condition imagining the maximum load. Accordingly, where the load is light, the rise of the output voltage relatively becomes early, and thus it is difficult to finely control the rise of the output voltage using only the soft start control.

Contrary to this, according to the present invention, it is possible to control the power turn-on sequence without depending on the load, only by changing circuit constants of the capacitor circuit for use in a soft start of a DC/DC apparatus using a plurality of power supplies.

Also, when the power supply to each DC/DC apparatus is turned off, a difference is made between the times required until the respective output voltages reach 0V, depending on lightness or heaviness of the respective loads and their load capacitances. In this case, if the power turn-off sequence is not properly controlled, the above latch-up phenomenon would be caused in semiconductor devices. Where such a latch-up is caused, some of the devices may be burned out.

According to the present invention, when the power supply to each DC/DC apparatus is turned off, a synchronous rectifying transistor or a load capacitance discharging transistor provided in each DC/DC apparatus is forcibly turned off to discharge charges corresponding to the load capacitance. Thus, it is possible to remove the disadvantage in that a difference is made between the times required until the respective output voltages reach 0V.

BRIEF DESCRIPTION OF THE DRAWINGS

Other constitutional features and modes of operation of the present invention will be described hereinafter in detail by way of preferred embodiments with reference to the accompanying drawings, in which:

FIG. 2 is a waveform diagram representing an operation of the DC/DC control circuit shown in FIG. 1b;

FIGS. 3a and 3b are waveform diagrams of the input voltages of the PWM comparator shown in FIG. 1b;

DESCRIPTION OF THE PREFERRED EMBODIMENTS

First, for better understanding of the preferred embodiments of the present invention, the related prior art will be explained with reference to FIGS. 1a to 9.

Figure 1A:
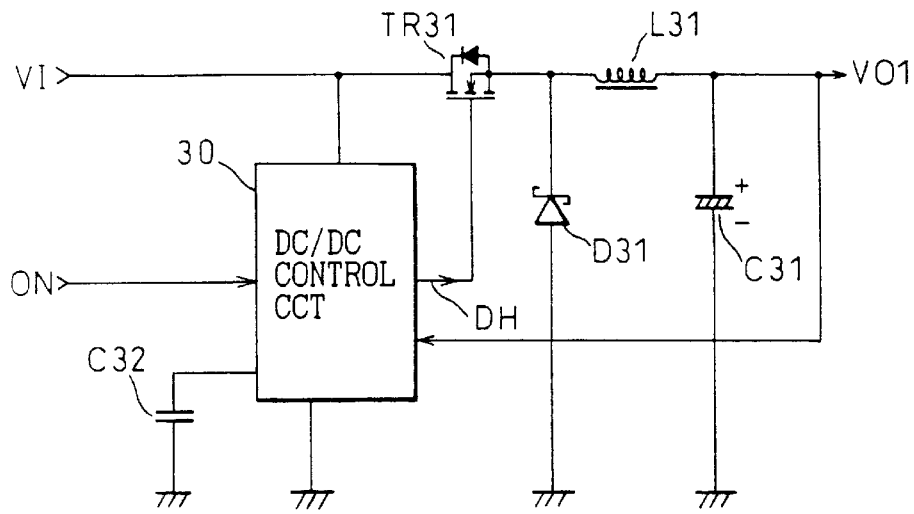
FIGS. 1a and 1b are diagrams showing the circuit constitution of a prior art DC/DC apparatus.

FIG. 1a shows the circuit constitution of a DC/DC apparatus used in an ordinary hand-held type personal computer or the like.

In FIG. 1a, reference ON denotes an on/off control signal for indicating a start (on) or a stop (off) of the operation of the DC/DC apparatus, and reference 30 denotes a DC/DC control circuit using a PWM control and responsive to the on/off control signal ON. Under control of the DC/DC control circuit 30, the DC/DC apparatus starts its operation when the on/off control signal ON is at "H" level, and stops its operation when the on/off control signal ON is at "L" level. Also, reference TR31 denotes a switching transistor which is turned on/off in response to an output DH of the DC/DC control circuit 30; reference L31 denotes a choke coil for converting an input voltage VI to an output voltage VO1; reference D31 denotes a fly-wheel diode for releasing energy accumulated in the choke coil L31 when the transistor TR31 is in off state; reference C31 denotes a capacitor for smoothing its input voltage (voltage at the output side of the choke coil L31); and reference C32 denotes a soft start capacitor for preventing rush current from flowing into the circuit when the operation of the DC/DC apparatus is started.

Note that, in the description below, "capacitor" indicates a soft start capacitor so long as a special definition is not given thereto.

Figure 1B:
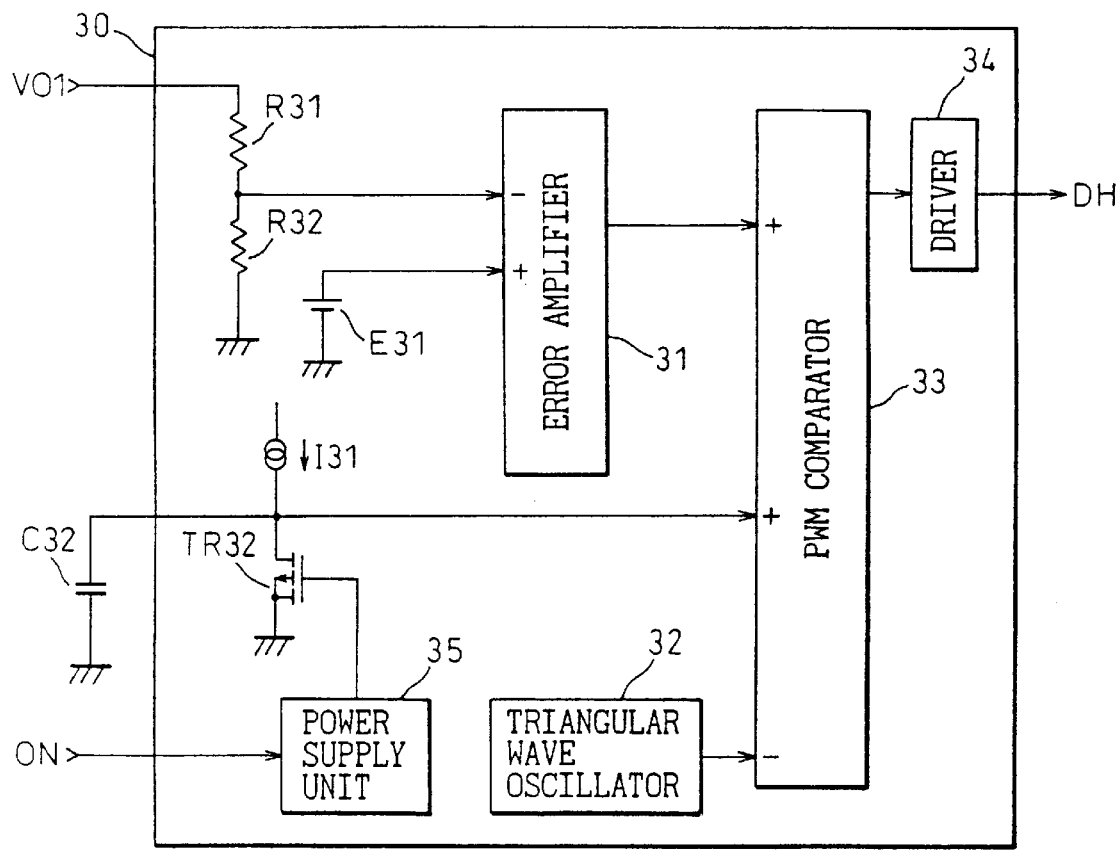

FIG. 1b shows the constitution of the DC/DC control circuit 30 shown in FIG. 1a.

In FIG. 1a, references R31 and R32 each denote a resistor for dividing the output voltage VO1 of the DC/DC apparatus, and respective resistance values are selected so that the divided voltage obtained when the output voltage VO1 is at a rated value becomes the same as a reference voltage E31. Also, reference 31 denotes an error amplifier for amplifying a difference between the voltage divided by the resistors R31 and R32 and the reference voltage E31; reference 32 denotes a triangular wave oscillator for oscillating a triangular wave signal at a constant frequency; and reference 33 denotes a PWM comparator for controlling a width (i.e., on period) of its output pulse according to an output voltage of the error amplifier 31. The PWM comparator 33 compares a voltage of the triangular wave signal from the oscillator 32 with both the output voltage of the error amplifier 31 and a terminal voltage of the capacitor C32, and is brought to on state when the voltage of the triangular wave signal is lower than any one of the two voltages, to thereby bring a subsequent driver 34 to on state. As a result, the output DH of the driver 34 is made "H" level and thus the switching transistor TR31 is turned on. Also, reference 35 denotes a power supply unit which responds to the on/off control signal ON and controls on/off of the power supply to the DC/DC control circuit to thereby control on/off (start/stop of the operation) of the entire DC/DC apparatus. Also, reference TR32 denotes a transistor for discharging charges of the capacitor C32 to set the terminal voltage thereof to 0 V when the operation of the DC/DC apparatus is stopped; and reference I31 denotes a constant current source for charging the capacitor C32 to raise the terminal voltage thereof in a constant time when the transistor TR32 is in off state.

Referring to FIG. 1a, the diode D31 forms a current path together with the choke coil L31 when the transistor TR31 is in off state. The transistor TR31 is controlled by the frequency of the output DH of the DC/DC control circuit 30, so as to keep the output voltage VO1 at a constant value. When the transistor TR31 is in on state, the input voltage VI is supplied to the LC circuit (the choke coil L31 and the capacitor C31). When the transistor TR31 is turned off, the energy accumulated in the choke coil L31 is supplied via the diode D31 to the load. At this time, the smoothing capacitor C31 smoothes its input voltage to provide the output voltage VO1.

Assuming that one cycle period of the on/off operation of the transistor TR31 is T; the period during which the transistor TR31 is in on state is Ton; and the period during which the transistor TR31 is in off state is Toff, the output voltage VO1 is expressed by the following equation.

$$VO1=[Ton/(Ton+Toff)] \times VI=(Ton/T) \times VI$$

Also, the current to flow through the choke coil L31 is fed from the input end (VI) when the transistor TR31 is in on state, and is fed via the diode D31 when the transistor TR31 is in off state. Accordingly, an average input current (Iin) is equal to the product of a duty (Ton/T) of the transistor TR31 and an output current (Iout), and thus is expressed by the following equation.

$$Iin=(Ton/T) \times Iout$$

From this equation, it will be appreciated that it is possible to compensate a fluctuation of the input voltage by controlling the duty cycle. In the same way, where the output voltage VO1 fluctuates depending on a fluctuation of the load, it is possible to keep the output voltage VO1 at a constant value by detecting the voltage VO1 and controlling the duty cycle.

FIG. 2 shows waveforms representing an operation of the DC/DC control circuit 30.

First, for simplification of the explanation, the operation as to the case where the capacitor C32 is not provided will be explained.

The output voltage VO1 is suitably divided by the resistors R31 and R32 and the divided voltage is input to the error amplifier 31. The error amplifier 31 amplifies a difference between the divided voltage and the reference voltage E31, and outputs the amplified voltage to the PWM comparator 33. As described above, the PWM comparator 33 controls the width of its output pulse based on a comparison of the output voltage of the error amplifier 31 with the triangular wave voltage. Accordingly, when the output voltage of the error amplifier 31 becomes larger, the output pulse width of the PWM comparator 33 accordingly becomes wider. On the other hand, when the output voltage of the error amplifier 31 becomes smaller, the output pulse width of the PWM comparator 33 accordingly becomes narrower. Therefore, when the output voltage VO1 is lowered, the output voltage of the error amplifier 31 becomes large and thus the output pulse width of the PWM comparator 33 becomes wide. As a result, the on period (Ton) of the transistor TR31 becomes long. Inversely, when the output voltage VO1 is heightened, the output voltage of the error amplifier 31 becomes small and thus the output pulse width of the PWM comparator 33 becomes narrow. As a result, the on period (Ton) of the transistor TR31 becomes short.

Thus, in the DC/DC apparatus using a PWM control, it is possible to control the output voltage VO1 by controlling the on/off ratio of the switching transistor TR31.

By the way, since the output voltage VO1 is 0V when the operation of the DC/DC apparatus is started, the difference between the input voltage VI and the output voltage VO1 is the maximum and thus the output voltage of the error amplifier 31 is also the maximum. Accordingly, the output pulse width of the PWM comparator 33 becomes the maximum and thus the on period (Ton) of the transistor TR31 also becomes the maximum. Also, the maximum current (Ipeak) flowing through the choke coil L31 is determined by an inductance (L) of the choke coil L31, the input voltage VI, the output voltage VO1 and the on period (Ton) of the transistor TR31, and is expressed by the following equation.

$$Ipeak=[(VI-VO1)/L] \times Ton$$

From this equation, it will be appreciated that an excessive rush current flows through the transistor TR31 and the choke coil L31 since the output voltage VO1 is 0V and the on period (Ton) of the transistor TR31 is the maximum when the operation of the DC/DC apparatus is started.

To solve such a drawback, a control of temporarily reducing the on period (Ton) when the operation of the DC/DC apparatus is started is carried out. Such a control is called "soft start".

Referring back to FIG. 1b, the capacitor C32 is provided to carry out the soft start. By the operation of the capacitor C32, it is possible to lower one of a plurality of non-inverting input voltages input to the PWM comparator 33 when the operation of the DC/DC apparatus is started, and thus to forcibly reduce the on period (Ton). As a result, it is possible to prevent an excessive rush current from flowing into the circuit.

The PWM comparator 33 compares the output voltage of the triangular wave oscillator 32 with both the output voltage of the error amplifier 31 and the voltage of the capacitor C32, and is brought to on state only when the triangular wave voltage is lower than any one of the two voltages, to thereby control the driver 34 to turn on the transistor TR31. When the operation of the DC/DC apparatus is started, the output voltage of the error amplifier 31 is the maximum, but the voltage of the capacitor C32 is around 0V. Accordingly, the output pulse width of the PWM comparator 33 is mainly controlled by the voltage of the capacitor C32, and is not substantially controlled by the output voltage of the error amplifier 31. As a result, the output pulse width of the PWM comparator 33 becomes extremely short.

As is appreciated from the above equation, even if the output voltage VO1 is extremely small, it is possible to limit the quantity of the rush current flowing into the choke coil L31 by reducing the on period (Ton) of the transistor TR31. Since the voltage of the capacitor C32 is charged by the constant current source I31, the output pulse width of the PWM comparator 33 gradually becomes long according to the rise of the voltage of the capacitor C32. As a result, the output voltage VO1 also gradually rises and thus the current flowing into the choke coil L31 is not excessively increased. When the voltage of the capacitor C32 then exceeds the output voltage of the error amplifier 31, the DC/DC apparatus is controlled with a pulse width determined by the output voltage of the error amplifier 31.

Thus, by making the on period (Ton) gradually long according to the charging time constant of the capacitor C32, it is possible to suppress the rush current.

Next, the relationship between the rise characteristics of the output voltage obtained when the power supply to the DC/DC apparatus is turned on and the load will be explained.

As described above, the on period (Ton) of the transistor TR31 is determined by a voltage of a lower potential among the two non-inverting input voltages (i.e., the output voltage of the error amplifier 31 and the voltage of the capacitor C32) input to the PWM comparator 33.

FIGS. 3a and 3b show waveforms of the input voltages of the PWM comparator 33 in the case where the load is light, and in the case where the load is heavy, respectively.

At a point of time t0 when the power supply to the DC/DC apparatus is turned on, the output voltage of the error amplifier 31 is the maximum, but the voltage of the capacitor C32 is around 0V. Accordingly, the on period (Ton) of the transistor TR31 is determined only by the voltage of the capacitor C32.

With a lapse of time, the voltage of the capacitor C32 gradually rises with a gradient determined by the capacitance of the capacitor C32. On the other hand, the output voltage of the error amplifier 31 gradually falls since the output voltage VO1 gradually rises. Then, after a lapse of time (a point of time t1 in FIG. 3a, and a point of time t2 in FIG. 3b), the voltage of the capacitor C32 exceeds the output voltage of the error amplifier 31. Thereafter, the on period (Ton) of the transistor TR31 is controlled by the output voltage of the error amplifier 31.

From the above, at a point of time before the cross point at which the voltage curve of the capacitor C32 intersects the output voltage curve of the error amplifier 31, the on period (Ton) of the transistor TR31 is controlled only by the voltage of the capacitor C32, regardless of the output voltage VO1. At this time, the current to be fed to the output side of the DC/DC apparatus substantially becomes constant.

Accordingly, where the load of the DC/DC apparatus is light (see FIG. 3a), the output voltage VO1 begins to rise in a relatively short time (at the point of time t1), and where the load of the DC/DC apparatus is heavy (see FIG. 3b), the output voltage VO1 begins to rise at the point of time t2 later than the point of time t1. As described above, the output voltage of the error amplifier 31 is obtained by amplifying the difference between the reference voltage E31 and the divided voltage proportional to the output voltage VO1. Accordingly, at a point of time tx before the cross point, the lighter the load of the DC/DC apparatus becomes, the lower the output voltage of the error amplifier 31 becomes, and the heavier the load of the DC/DC apparatus becomes, the higher the output voltage of the error amplifier 31 becomes.

Namely, the lighter the load of the DC/DC apparatus becomes, the shorter the time necessary to reach the cross point becomes, and the heavier the load of the DC/DC apparatus becomes, the longer the time necessary to reach the cross point becomes. This means that the rise characteristics of the output voltage of the DC/DC apparatus differ depending on lightness or heaviness of the load, i.e., that the lighter the load becomes, the earlier the rise becomes, and the heavier the load becomes, the later the rise becomes.

Figure 4:
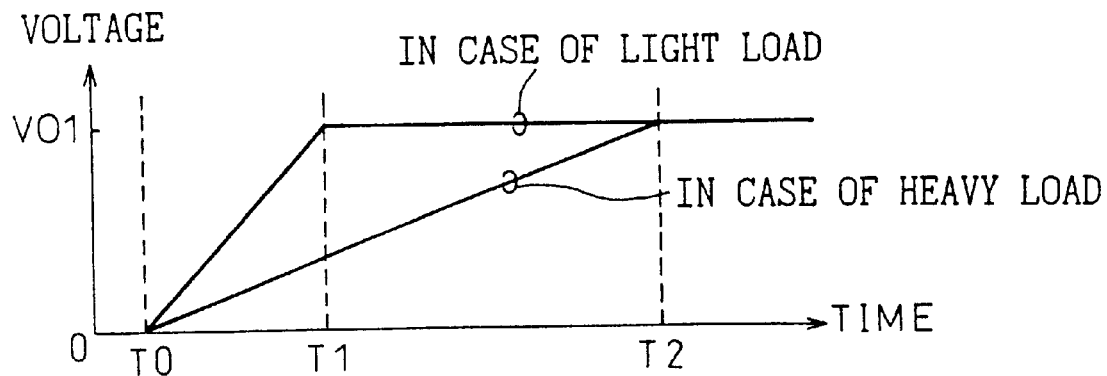
FIG. 4 is an explanatory diagram of the rise characteristics of the output voltage of the prior art DC/DC apparatus.

The above will be explained with reference to FIG. 4.

When the on/off control signal ON is made "H" level at a point of time T0, the power supply to the DC/DC apparatus is turned on. Assuming that the load of the DC/DC apparatus is light, the output voltage of the DC/DC apparatus gradually rises and reaches the rated voltage VO1 at a point of time T1. On the other hand, assuming that the load of the DC/DC apparatus is heavy, the output voltage of the DC/DC apparatus gradually rises, but cannot reach the rated voltage VO1 at the point of time T1 because of the heaviness of the load. Thereafter, the output voltage reaches the rated voltage VO1 at a point of time T2.

Figure 5:
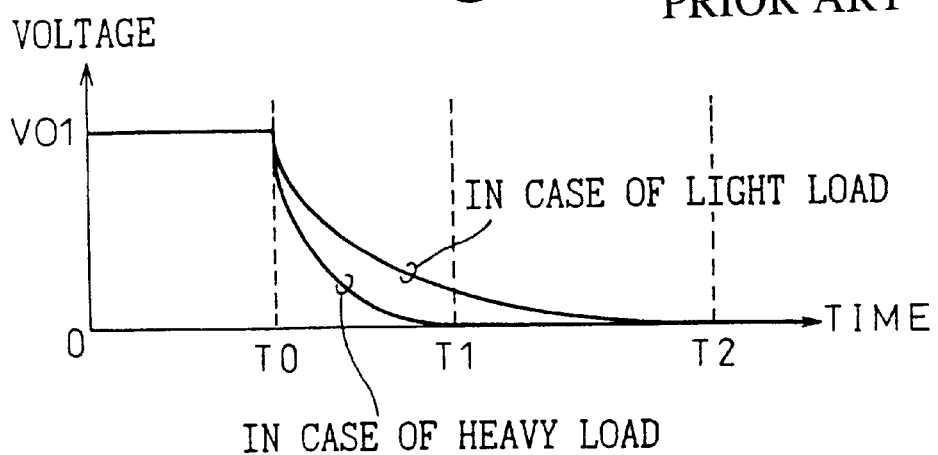
FIG. 5 is an explanatory diagram of the fall characteristics of the output voltage of the prior art DC/DC apparatus.

Next, the fall characteristics of the output voltage obtained when the power supply to the DC/DC apparatus is turned off will be explained with reference to FIG. 5.

The fall of the output voltage is determined by the time required for discharging charges accumulated in the smoothing capacitor C31 which is the load capacitance of the DC/DC apparatus. When the on/off control signal ON is changed from "H" level to "L" level at a point of time T0, the power supply to the DC/DC apparatus is turned off.

Assuming that the load of the DC/DC apparatus is heavy, the output voltage of the DC/DC apparatus gradually falls and reaches 0V at a point of time T1. On the other hand, assuming that the load of the DC/DC apparatus is light, the output voltage of the DC/DC apparatus gradually falls, but cannot reach 0V at the point of time T1 because of the lightness of the load. Thereafter, the output voltage reaches 0V at a point of time T2.

As explained above, according to the prior art, where the load of the DC/DC apparatus is heavy, the output voltage of the DC/DC apparatus rises in proportion to the quantity of charges accumulated in the capacitor C32. Accordingly, the output voltage exhibits the rise characteristics depending on a time constant determined by the capacitance of the capacitor C32. Contrary to this, where the load of the DC/DC apparatus is light, the output voltage of the DC/DC apparatus rises in a shorter time than the time constant determined by the capacitance of the capacitor C32.

Thus, the prior art capacitor circuit provided to carry out the soft start has only the function of preventing an excessive rush current from flowing into the DC/DC apparatus, and does not have a function of controlling the rise characteristics of the output voltage of the DC/DC apparatus.

Also, where a plurality of power supplies are used in an electronic apparatus, if turn-on/turn-off sequences between the respective power supplies are not fully taken into consideration, a latch-up phenomenon may be caused in semiconductor devices used in the electronic apparatus and thus some devices may be burned out. As described above, the rise characteristics of the output voltage obtained when the power supply to the DC/DC apparatus is turned on depend on the load of the DC/DC apparatus, and thus it is substantially impossible to control the rise characteristics using only the soft start capacitor. Therefore, to control the turn-on sequence between the plurality of power supplies, a special logic circuit for the sequence control is required.

Figure 6:
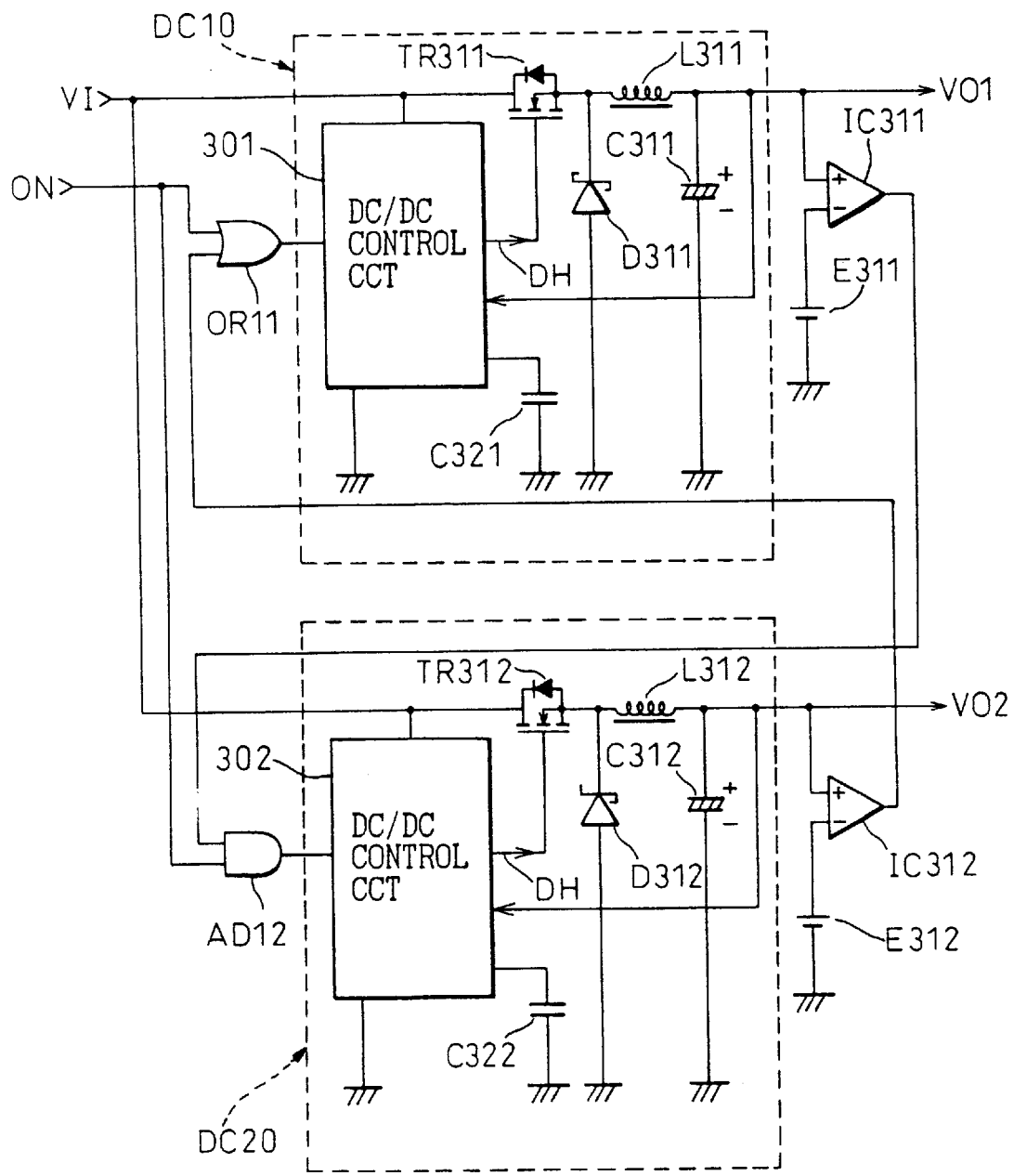
FIG. 6 is a diagram showing the circuit constitution by which turn-on/turn-off sequences are controlled between the two power supplies using the prior art DC/DC apparatus.
Figure 7:
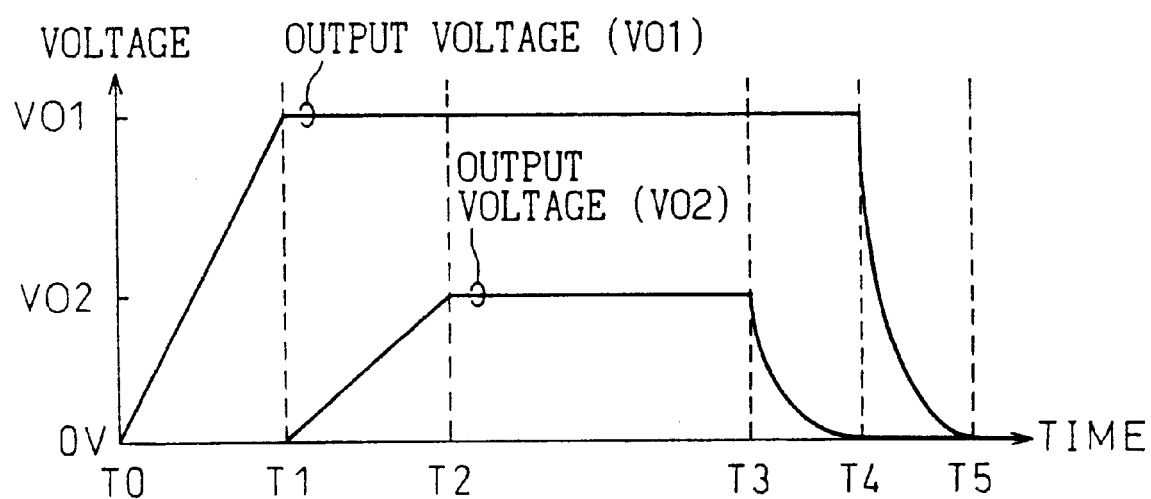
FIG. 7 is an explanatory diagram of the rise/fall characteristics of the output voltages based on the circuit constitution of FIG. 6.

FIG. 6 shows the circuit constitution by which turn-on/turn-off sequences are controlled between the two power supplies (the DC/DC apparatuses DC10 and DC20), and FIG. 7 shows the rise/fall characteristics of the output voltages based on the circuit constitution.

The constitution of each of the DC/DC apparatuses DC10 and DC20 is the same as that of the DC/DC apparatus shown in FIG. 1a, and thus the explanation thereof is omitted. Accordingly, only the explanation as to the circuit portion which controls power turn-on/turn-off sequences with respect to the DC/DC apparatuses DC10 and DC20 is given.

In FIG. 6, reference IC311 denotes a voltage comparator for comparing an output voltage VO1 of the DC/DC apparatus DC10 with a reference voltage E311. The voltage comparator IC311 outputs a "H" level signal when the output voltage VO1 is equal to or above the reference voltage E311, and outputs a "L" level signal when the output voltage VO1 is below the reference voltage E311. Reference IC312 denotes a voltage comparator for comparing an output voltage VO2 of the DC/DC apparatus DC20 with a reference voltage E312. The voltage comparator IC312 outputs a "H" level signal when the output voltage VO2 is equal to or above the reference voltage E312, and outputs a "L" level signal when the output voltage VO2 is below the reference voltage E312. Also, reference OR11 denotes an OR gate responsive to the on/off control signal ON and an output signal of the voltage comparator IC312, and reference AD12 denotes an AND gate responsive to the on/off control signal ON and an output signal of the voltage comparator IC311. When the OR gate OR11 outputs a "H" level signal, the DC/DC control circuit 301 is enabled to start the operation of the DC/DC apparatus DC10. In the same way, when the AND gate AD12 outputs a "H" level signal, the DC/DC control circuit 302 is enabled to start the operation of the DC/DC apparatus DC20.

When the on/off control signal ON is at "L" level, the respective operations of the DC/DC apparatuses DC10 and DC20 are stopped, and thus the voltage comparators IC311 and IC312 output a "L" level signal, respectively.

When the on/off control signal ON is made "H" level and thus the power turn-on of the DC/DC apparatuses DC10 and DC20 is instructed, the OR gate OR11 outputs a "H" level signal to the DC/DC control circuit 301 and thus the operation of the DC/DC apparatus DC10 is started. On the other hand, the AND gate AD12 continues to output a "L" level signal to the DC/DC control circuit 302 since the output signal of the voltage comparator IC311 is still at "L" level. Accordingly, the operation of the DC/DC apparatus DC20 is still stopped. As a result, only the power supply to the DC/DC apparatus DC10 is turned on.

When the power turn-on sequence of the DC/DC apparatus DC10 is completed and the output voltage VO1 exceeds the reference voltage E311, the output signal of the voltage comparator IC311 is changed to "H" level. As a result, the AND gate AD12 outputs a "H" level signal and thus the operation of the DC/DC apparatus DC20 is started.

Also, when the power turn-on sequence of the DC/DC apparatus DC20 is completed and the output voltage VO2 exceeds the reference voltage E312, the output signal of the voltage comparator IC312 is changed to "H" level. Since the OR gate OR11 outputs a "H" level signal when at least one of the on/off control signal ON and the output signal of the voltage comparator IC312 is at "H" level, the OR gate OR11 continues to output the "H" level signal to the DC/DC control circuit 301. Accordingly, as long as the on/off control signal ON is thereafter at "H" level, the DC/DC apparatuses DC10 and DC20 continue the respective operations, and thus the voltage comparators IC311 and IC312 continue to output a "H" level signal, respectively.

Next, when the on/off control signal ON is made "L" level and thus the power turn-off of the DC/DC apparatuses DC10 and DC20 is instructed, the AND gate AD12 outputs a "L" level signal to the DC/DC control circuit 302 and thus the operation of the DC/DC apparatus DC20 is stopped. On the other hand, the OR gate OR11 continues to output a "H" level signal to the DC/DC control circuit 301 since the output signal of the voltage comparator IC312 is still at "H" level. Accordingly, the operation of the DC/DC apparatus DC10 is still maintained. As a result, only the power supply to the DC/DC apparatus DC20 is turned off.

When the power turn-off sequence of the DC/DC apparatus DC20 is completed and the output voltage VO2 is below the reference voltage E312, the output signal of the voltage comparator IC312 is changed to "L" level. As a result, the OR gate OR11 outputs a "L" level signal and thus the operation of the DC/DC apparatus DC10 is stopped.

Also, when the power turn-off sequence of the DC/DC apparatus DC10 is completed and the output voltage VO1 is below the reference voltage E311, the output signal of the voltage comparator IC311 is changed to "L" level. Since the AND gate AD12 outputs a "L" level signal when at least one of the on/off control signal ON and the output signal of the voltage comparator IC311 is at "L" level, the AND gate AD12 continues to output the "L" level signal to the DC/DC control circuit 302. Accordingly, as long as the on/off control signal ON is thereafter at "L" level, the respective operations of the DC/DC apparatuses DC10 and DC20 continue to be stopped, and thus the voltage comparators IC311 and IC312 continue to output a "L" level signal, respectively.

The above will be explained with reference to FIG. 7.

When the on/off control signal ON is made "H" level at a point of time T0, the power supply to the DC/DC apparatus DC10 is turned on. Accordingly, the output voltage of the DC/DC apparatus DC10 gradually rises and reaches the rated voltage VO1 at a point of time T1. At this time, the power supply to the DC/DC apparatus DC20 is not yet turned on. When the output voltage of the C/DC apparatus DC10 reaches the rated voltage VO1 at the point of time T1, the AND gate AD12 outputs a "H" level signal and thus the power supply to the DC/DC apparatus DC20 is turned on. As a result, the output voltage of the DC/DC apparatus DC20 gradually rises and reaches the rated voltage VO2 at a point of time T2. Thus, the power turn-on sequences of the DC/DC apparatuses DC10 and DC20 are controlled.

Next, when the on/off control signal ON is made "L" level at a point of time T3, the AND gate AD12 outputs a "L" level signal and thus the power turn-off of the DC/DC apparatus DC20 is instructed. Accordingly, the output voltage of the DC/DC apparatus DC20 gradually falls and reaches 0V at a point of time T4. At this time, the power supply to the DC/DC apparatus DC10 is not yet turned off. When the output voltage of the DC/DC apparatus DC20 reaches 0V at the point of time T4, the OR gate OR11 outputs a "L" level signal and thus the power supply to the DC/DC apparatus DC10 is turned off. As a result, the output voltage of the DC/DC apparatus DC10 gradually falls and reaches 0V at a point of time T5. Thus, the power turn-off sequences of the DC/DC apparatuses DC10 and DC20 are controlled.

As explained above, where the power turn-on/turn-off sequences are controlled between the two DC/DC apparatuses, the logic circuit (OR gate OR11, AND gate AD12, voltage comparators IC311 and IC312, and the like) for the sequence control must be provided in addition to the DC/DC apparatuses. Namely, it is substantially impossible to control the power turn-on/turn-off sequences using only the DC/DC apparatuses.

Figure 8:
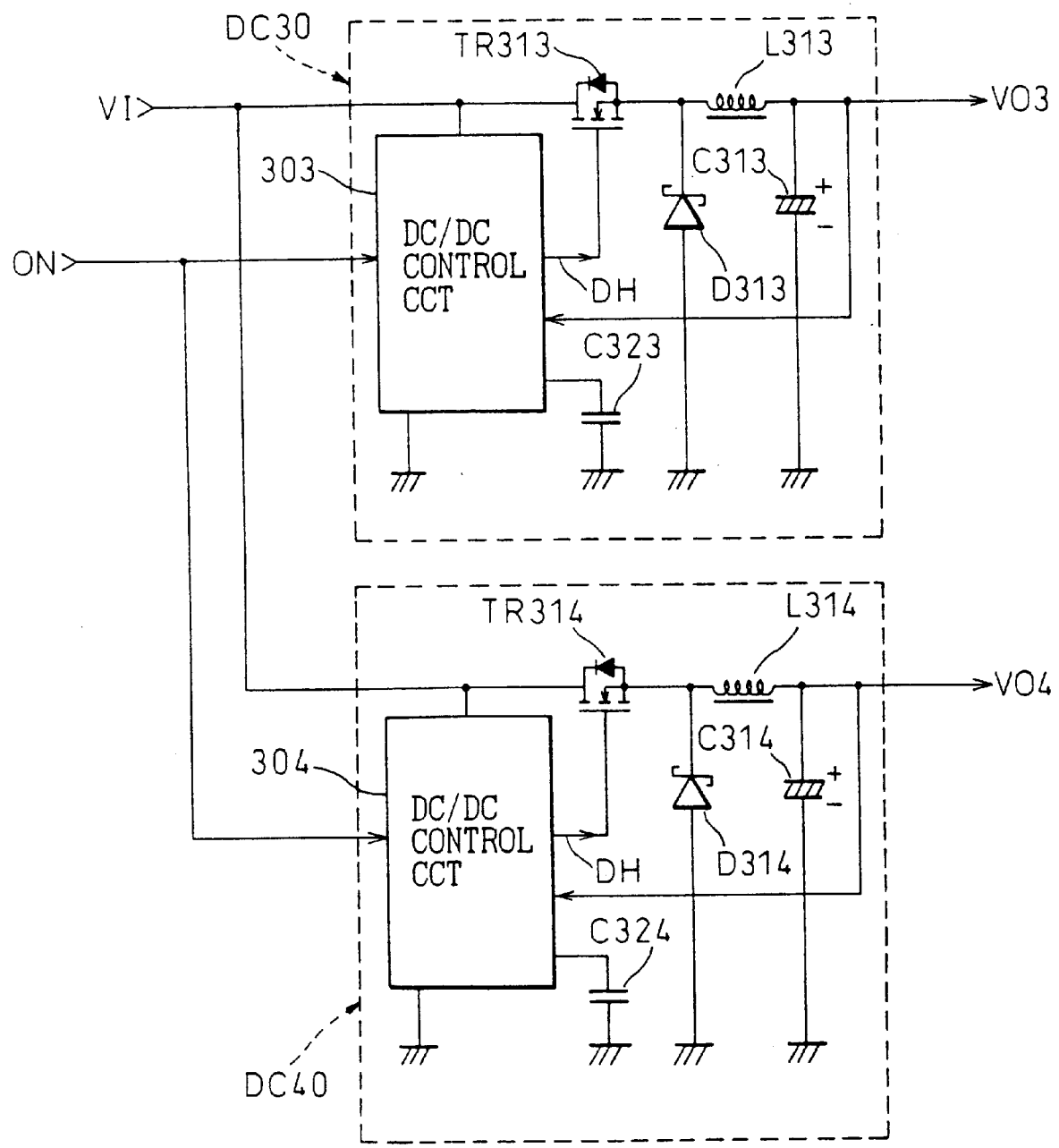
FIG. 8 is a diagram showing the circuit constitution by which the two power supplies are simultaneously turned on using the prior art DC/DC apparatus.
Figure 9:
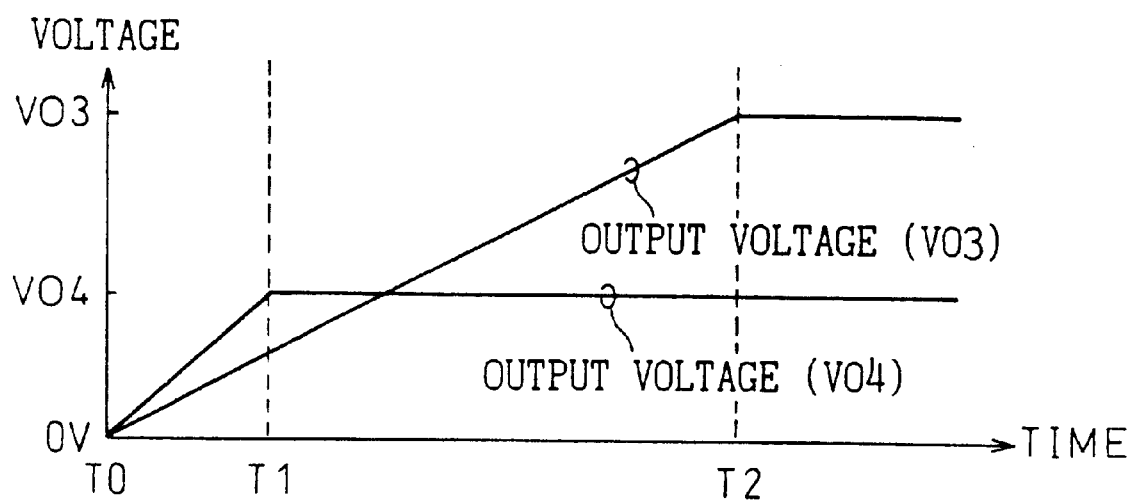
FIG. 9 is an explanatory diagram of the rise characteristics of the output voltages based on the circuit constitution of FIG. 8.

FIG. 8 shows the circuit constitution by which the two power supplies (the DC/DC apparatuses DC30 and DC40) are simultaneously turned on, and FIG. 9 shows the rise characteristics of the output voltages based on the circuit constitution.

The constitution of each of the DC/DC apparatuses DC30 and DC40 is the same as that of the DC/DC apparatus shown in FIG. 1a, and thus the explanation thereof is omitted.

In the constitution of FIG. 8, the on/off control signal ON is commonly input to the DC/DC apparatuses DC30 and DC40 so as to simultaneously turn on the respective power supplies thereof. When the on/off control signal ON is at "L" level, the respective operations of the DC/DC apparatuses DC30 and DC40 are stopped.

When the on/off control signal ON is made "H" level, the respective power turn-on sequences of the DC/DC apparatuses DC30 and DC40 are started. However, as explained with reference to FIGS. 1a to 3b, the respective rise characteristics of the output voltage VO3 of the DC/DC apparatus DC30 and the output voltage VO4 of the DC/DC apparatus DC40 depend on lightness or heaviness of the respective loads. Accordingly, it cannot be ensured that the output voltages VO3 and VO4 rise simultaneously.

The above will be explained with reference to FIG. 9.

When the on/off control signal ON is made "H" level at a point of time T0, the power supplies to the DC/DC apparatuses DC30 and DC40 are turned on. Assuming that the load of the DC/DC apparatus DC30 is heavier than that of the DC/DC apparatus DC40, the output voltage of the DC/DC apparatus DC40 gradually rises and reaches the rated voltage VO4 at a point of time T1. On the other hand, the output voltage of the DC/DC apparatus DC30 gradually rises, but cannot reach the rated voltage VO3 at the point of time T1 because of the heaviness of the load. Thereafter, the output voltage of the DC/DC apparatus DC30 reaches the rated voltage VO3 at a point of time T2.

Thus, in the prior art, where the power supplies are simultaneously turned on with respect to the two DC/DC apparatuses, it is substantially impossible to control the rise characteristics of the respective output voltages since the rise characteristics depend on lightness or heaviness of the respective loads. As a result, in a system using a plurality of power supplies, a drawback occurs in that a latch-up phenomenon is caused in semiconductor devices and thus some devices are burned out.

Figure 10:
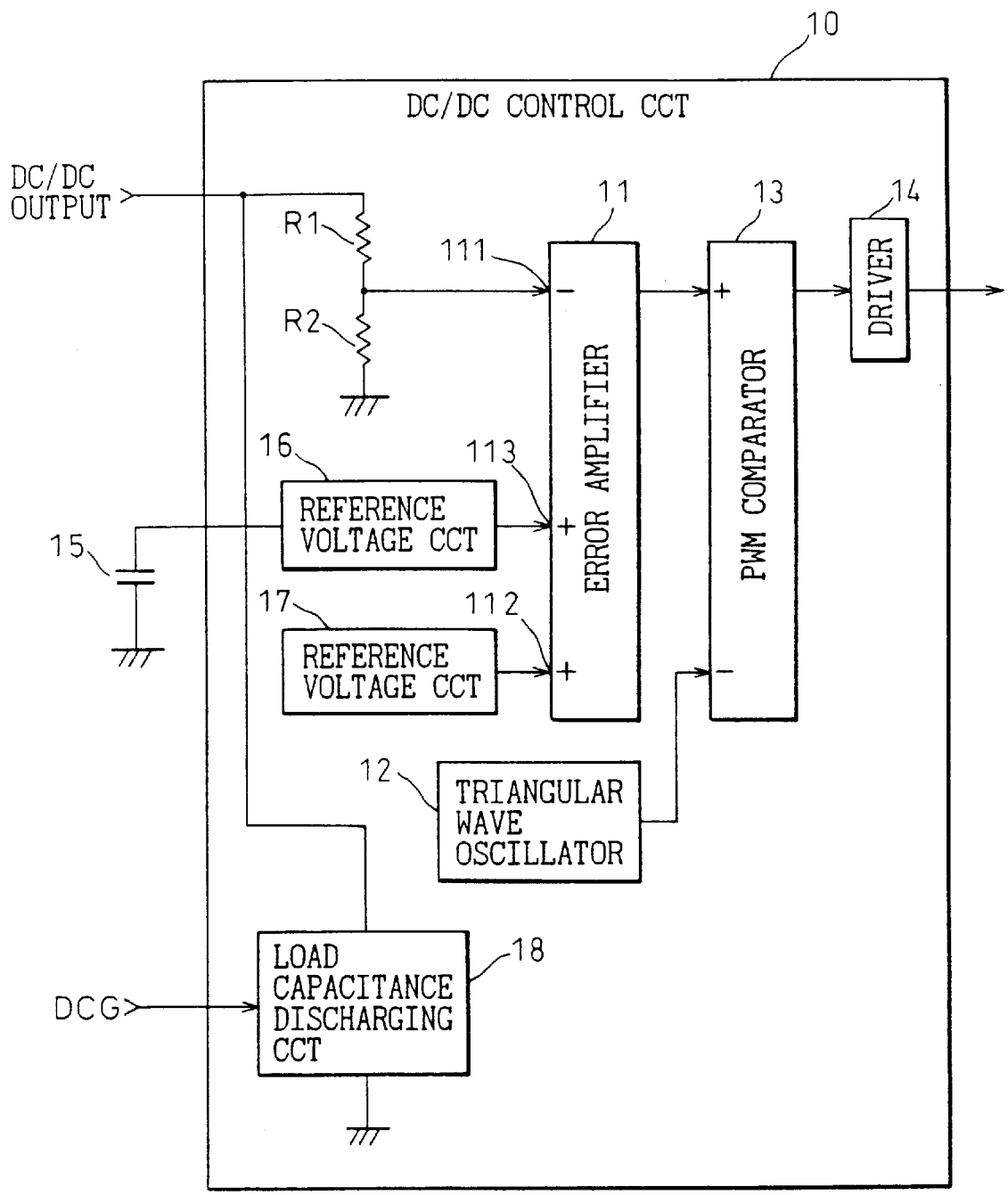
FIG. 10 is a diagram showing the fundamental constitution of the DC/DC apparatus according to a first aspect of the present invention.

FIG. 10 shows the fundamental constitution of the DC/DC apparatus according to the first aspect of the present invention.

In FIG. 10, reference 10 denotes a DC/DC control circuit using a PWM control; reference 11 denotes an error amplifier for voltage control; reference 12 denotes a triangular wave oscillator (and generating) for oscillating a triangular wave signal; reference 13 denotes a PWM comparator for comparing an output voltage of the error amplifier 11 with an output voltage of the triangular wave oscillator 12 and controlling an on period of its output pulse; reference 14 denotes a driver for driving a switching transistor (not shown in FIG. 10); reference 15 denotes a soft start capacitor; references 16 and 17 denote corresponding reference voltage circuits supplying respective reference voltages to the error amplifier 11; reference 18 denotes a load capacitance discharging circuit for forcibly discharging charges corresponding to the load capacitance when the operation of the DC/DC apparatus is stopped; and reference DCG denotes a discharging control signal indicating validity or invalidity of the discharging with respect to the load capacitance discharging circuit 18.

In a preferred aspect of the present invention, the error amplifier 11 includes a first input terminal 111 for inputting a voltage signal obtained from an output voltage of a DC/DC result, a second input terminal 112 for inputting a predetermined reference voltage signal, a third input terminal 113 for inputting a reference voltage signal used as a soft start signal when a power supply to the DC/DC apparatus is turned on. The error amplifier 11 amplifies a difference between a voltage signal input from the first input terminal 111 and a voltage signal of a lower potential, among the voltage signals input from the second and third input terminals 112 and 113. Based on an output of the error amplifier 11, the PWM comparator 13 carries out the pulse width modulation control. Accordingly, it is possible to control the rise characteristics of the output voltage obtained when the power supply to the DC/DC apparatus is turned on, without depending on lightness or heaviness of the load.

Also, the capacitor 15 is provided for supplying the reference voltage via the reference voltage circuit 16 to the third input terminal 113 of the error amplifier 11, and the reference voltage is continuously changed between 0V and the rated voltage. Accordingly, it is possible to prevent overshoots from occurring in the output voltage.

Also, in another preferred aspect of the present invention, a plurality of DC/DC control circuits, each being the DC/DC control circuit 10, are provided and a plurality of capacitors, each being the capacitor 15, are provided to correspond to the plurality of DC/DC control circuits on one-to-one basis, and respective capacitance values are properly changed between the plurality of capacitors. Accordingly, it is possible to easily control a turn-on sequence between the plurality of power supplies without using any special logic circuit for controlling the power turn-on sequence.

Also, in still another preferred aspect of the present invention, a plurality of DC/DC control circuits, each being the DC/DC control circuit 10, are provided and the capacitor 15 is provided to be shared by the plurality of DC/DC control circuits, and based on a time constant determined by a capacitance value of the capacitor 15, rise times of respective output voltages of DC/DC results controlled by the plurality of DC/DC control circuits are controlled. Accordingly, it is possible to control the rises of the respective output voltages so as to be the same as each other.

Furthermore, in another preferred aspect of the present invention, the load capacitance discharging circuit 18 is provided for discharging charges corresponding to the output voltage of a DC/DC result to be input to the error amplifier 11 when a power supply to the DC/DC apparatus is turned off. Accordingly, where a plurality of power supplies (i.e., DC/DC apparatuses) are used, it is possible to control the fall times of respective output voltages so as to be the same as each other.

Also, the DC/DC control circuit 10 further includes means for inputting the discharging control signal DCG, and the load capacitance discharging circuit 18 is operated when the validity of the discharging is indicated by the discharging control signal DCG. Accordingly, it is possible to control the discharging of the charges corresponding to the load capacitance by the external signal (discharging control signal DCG).

Figure 11:
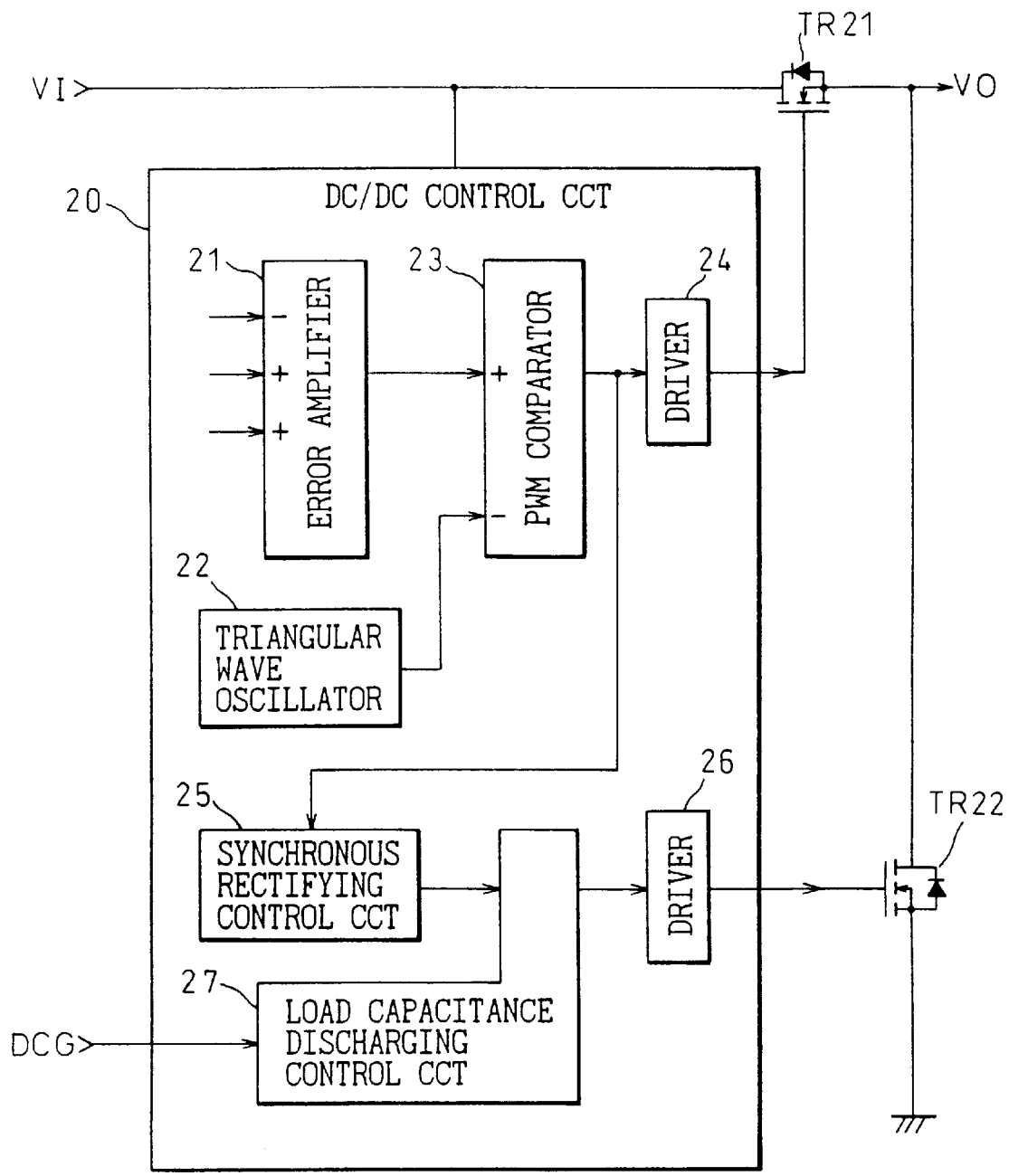
FIG. 11 is a diagram showing the fundamental constitution of the DC/DC apparatus according to a second aspect of the present invention.

FIG. 11 shows the fundamental constitution of the DC/DC apparatus according to the second aspect of the present invention.

In FIG. 11, reference 20 denotes a DC/DC control circuit using a synchronous rectifying control; reference 21 denotes an error amplifier for voltage control; reference 22 denotes a triangular wave oscillator for oscillating a triangular wave signal; reference 23 denotes a PWM comparator for comparing an output voltage of the error amplifier 21 with an output voltage of the triangular wave oscillator 22 and controlling an on period of its output pulse; reference 24 denotes a driver for driving a switching transistor TR21; reference 25 denotes a synchronous rectifying control circuit; reference 26 denotes a driver for driving a synchronous rectifying transistor TR22; reference 27 denotes a load capacitance discharging control circuit for controlling the discharging of charges corresponding to the load capacitance when the operation of the DC/DC apparatus is stopped; and reference DCG denotes a discharging control signal indicating validity or invalidity of the discharging with respect to the load capacitance discharging control circuit 27.

In a preferred aspect of the present invention, the load capacitance discharging control circuit 27 is provided for turning on the synchronous rectifying transistor TR22 to discharge charges corresponding to the output voltage VO of a DC/DC result when a power supply to the DC/DC apparatus is turned off. Accordingly, where a plurality of DC/DC apparatuses using a synchronous rectifying control are used, it is possible to control the fall times of respective output voltages so as to be the same as each other.

Also, the DC/DC control circuit 20 further includes means for inputting the discharging control signal DCG, and the load capacitance discharging control circuit 27 is operated when the validity of the discharging is indicated by the discharging control signal DCG. Accordingly, it is possible to control the discharging of the charges corresponding to the load capacitance by the external signal (discharging control signal DCG).

Next, the preferred embodiments of the present invention will be explained in detail with reference to FIGS. 12a to 26.

Figure 12A:
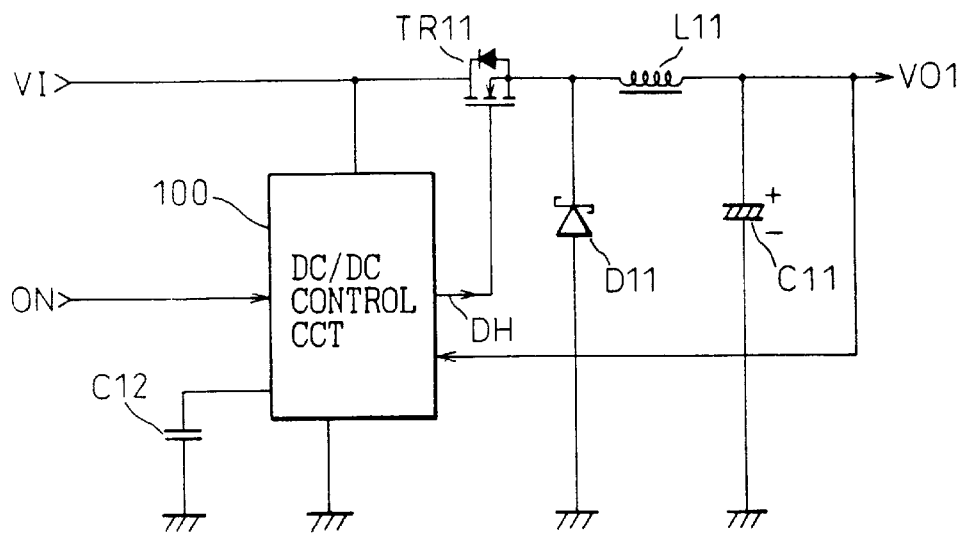
FIGS. 12a and 12b are diagrams showing the circuit constitution of an embodiment of the DC/DC apparatus according to the first aspect of the present invention.
Figure 12B:
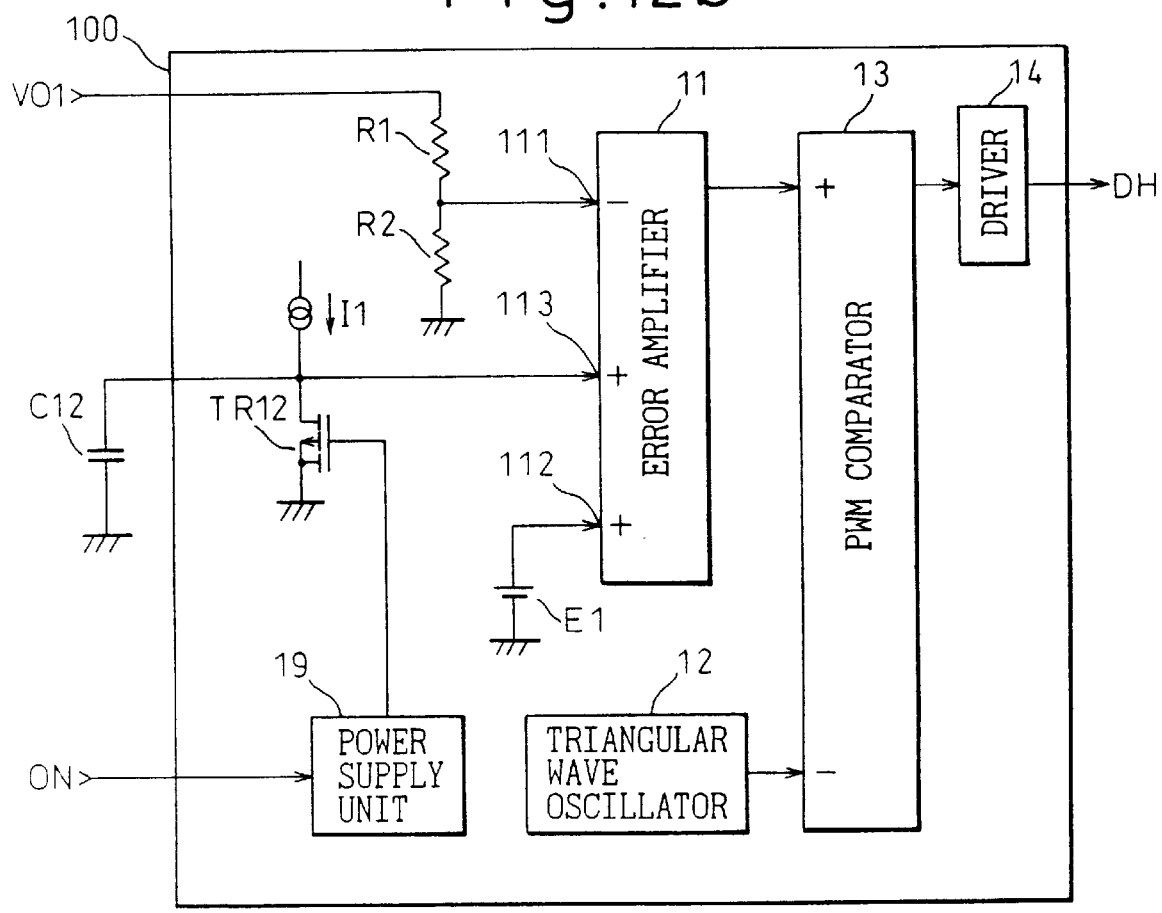

FIGS. 12a and 12b show the circuit constitution of an embodiment (DC/DC apparatus using a PWM control) of the DC/DC apparatus according to the first aspect of the present invention.

The constitution of the entire DC/DC apparatus shown in FIG. 12a is the same as that of the DC/DC apparatus shown in FIG. 1a, and thus the explanation thereof is omitted. Accordingly, only the explanation as to the DC/DC control circuit 100 shown in FIG. 12b is given.

In FIG. 12b, references R1 and R2 each denote a resistor for dividing the output voltage VO1 of the DC/DC apparatus; reference 11 denotes an error amplifier for amplifying a difference between the voltage divided by the resistors R1 and R2 and one of a plurality of reference voltages (in the illustrated example, a voltage of the capacitor C12 and a reference voltage E1); reference 12 denotes a triangular wave oscillator for oscillating a triangular wave signal at a constant frequency; and reference 13 denotes a PWM comparator for controlling an on period of its output pulse according to an output voltage of the error amplifier 11. The PWM comparator 13 compares a voltage of the triangular wave signal from the oscillator 12 with the output voltage of the error amplifier 11, and is brought to on state when the voltage of the triangular wave signal is lower than the output voltage of the error amplifier 11, to thereby bring a subsequent driver 14 to on state. As a result, the output DH of the driver 14 is made "H" level and thus the switching transistor TR11 is turned on. Also, reference 19 denotes a power supply unit which responds to the on/off control signal ON and controls on/off of the power supply to the DC/DC control circuit 100 to thereby control on/off (start/stop of the operation) of the entire DC/DC apparatus. Also, reference TR12 denotes a transistor for discharging charges of the capacitor C12 to set the terminal voltage thereof to 0V when the operation of the DC/DC apparatus is stopped; and reference I1 denotes a constant current source for charging the capacitor C12 to raise the terminal voltage thereof in a constant time when the transistor TR12 is in off state.

The constitution of the DC/DC control circuit 100 is substantially the same as that of the DC/DC control circuit 30 shown in FIG. 1b. The difference is that in the constitution of FIG. 1b, the capacitor C32 is connected to the non-inverting input of the PWM comparator 33; while in the constitution of the present embodiment (FIG. 12b), the capacitor C12 is connected to the non-inverting input of the error amplifier 11.

In FIG. 12b, the error amplifier 11 amplifies a difference between the voltage divided by the resistors R1 and R2 and a voltage of a lower potential among the reference voltage E1 and the voltage of the capacitor C12, and outputs the amplified voltage to the PWM comparator 13.

When the on/off control signal ON is at "L" level, the power supply unit 19 brings the entire DC/DC control circuit 100 to off state and turns on the transistor TR12 to thereby cause the terminal voltage of the capacitor C12 to be 0V.

When the on/off control signal ON is made "H" level and thus the power turn-on of the DC/DC apparatus is instructed, the DC/DC control circuit 100 starts its operation and the transistor TR12 is turned off. Accordingly, the charging to the capacitor C12 is started by the constant current source I1 and thus the voltage of the capacitor C12 gradually rises. After a lapse of time corresponding to the time constant determined by the capacitance of the capacitor C12 and the charging current value of the constant current source I1, the voltage of the capacitor C12 reaches the same voltage as the reference voltage E1.

The error amplifier 11 amplifies a difference between the inverting input voltage from the first input terminal 111 and a voltage of a lower potential among the non-inverting input voltages from the second and third input terminals 112 and 113, and outputs the amplified voltage to the PWM comparator 13. Accordingly, when the voltage of the capacitor C12 is lower than the reference voltage E1, the error amplifier 11 amplifies a difference between the divided voltage of the output voltage VO1 and the voltage of the capacitor C12, and when the voltage of the capacitor C12 is higher than the reference voltage E1, the error amplifier 11 amplifies a difference between the divided voltage of the output voltage VO1 and the reference voltage E1.

Figure 13:
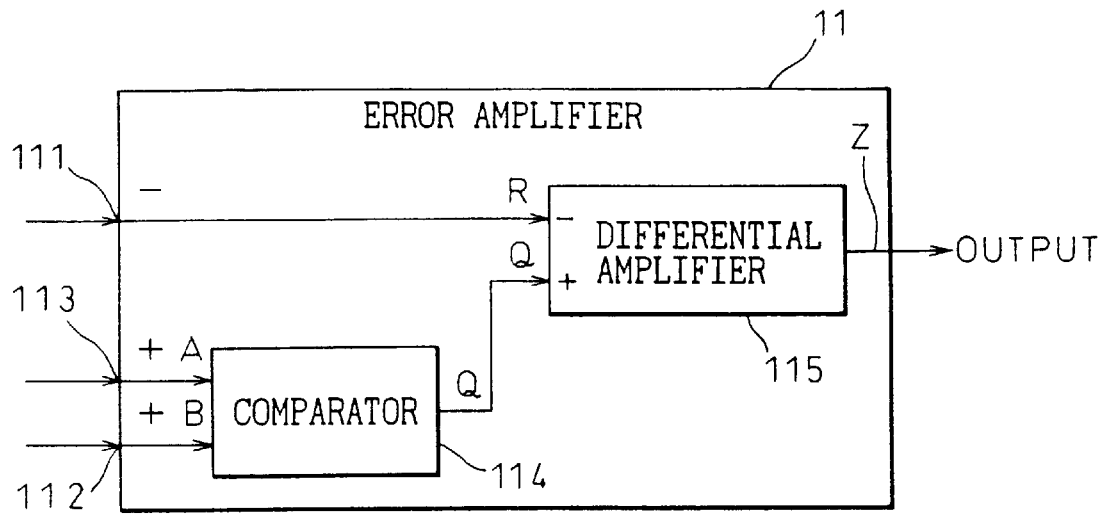
FIG. 13 is a diagram showing a constitution of the error amplifier shown in FIG. 12b.

FIG. 13 shows a constitution of the error amplifier 11.

As illustrated, the error amplifier 11 includes a comparator 114 for comparing voltages A and B input from the second and third input terminals 112 and 113 and outputting a voltage of a lower potential as its output voltage Q; and a differential amplifier 115 for amplifying a difference between the output voltage Q of the comparator 114 and a voltage R input from the first input terminal 111 and outputting the amplified voltage as its output voltage Z.

According to the present embodiment, since the control is carried out so as to gradually raise the reference voltage which determines the output voltage of the DC/DC apparatus, and to provide the rated output voltage VO1 after a constant time, the output voltage of the DC/DC apparatus can be controlled by the time constant determined by the capacitance of the capacitor C12, without depending on the load of the DC/DC apparatus. Namely, the smaller the capacitance of the capacitor C12 becomes, the shorter the rise time of the output voltage of the DC/DC apparatus becomes, and the larger the capacitance of the capacitor C12 becomes, the longer the rise time of the output voltage of the DC/DC apparatus becomes. Accordingly, by suitably selecting the capacitance of the capacitor C12, it is possible to arbitrarily control the rise characteristics of the output voltage of the DC/DC apparatus.

Figure 14:
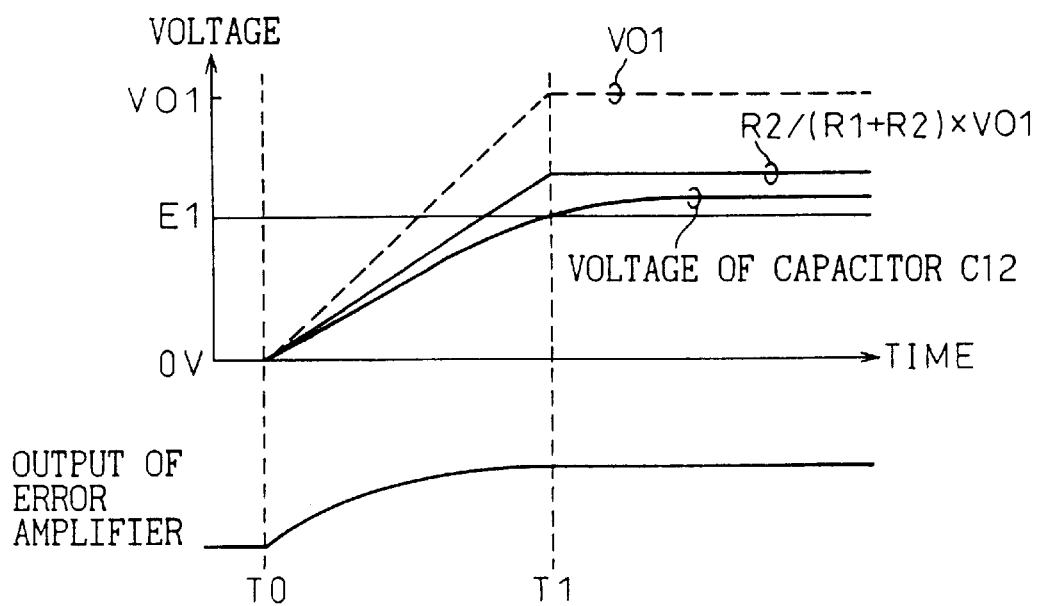
FIG. 14 is a waveform diagram representing an peration of the error amplifier of FIG. 13.

The above will be explained with reference to FIG. 14.

When the on/off control signal ON is made "H" level at a point of time T0, the operation of the DC/DC apparatus is started. Accordingly, the voltage of the capacitor C12 gradually rises and reaches the same voltage as the reference voltage E1 at a point of time T1. The output voltage of the DC/DC apparatus also gradually rises and reaches the rated voltage vo0 at the point of time T1. Namely, in the period from the point of time T0 to the point of time T1, the error amplifier 11 amplifies a difference between the divided voltage of the output voltage VO1 and the voltage of the capacitor C12, and after the point of time T1, the error amplifier 11 amplifies a difference between the divided voltage and the reference voltage E1.

Figure 15:
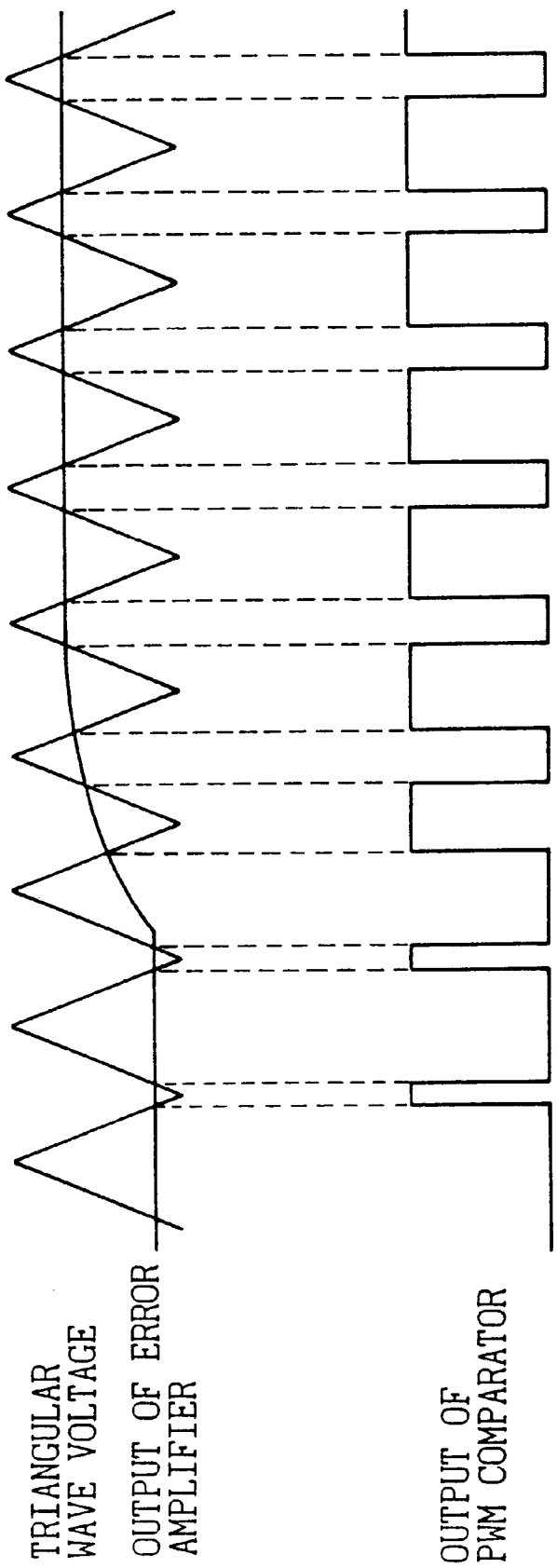
FIG. 15 is a waveform diagram representing an peration of the PWM comparator shown in FIG. 12b.

FIG. 15 shows waveforms representing an operation of the PWM comparator 13.

As illustrated, the PWM comparator 13 outputs a "H" level signal when the output voltage of the error amplifier 11 is higher than the output voltage of the triangular wave oscillator 12, and outputs a "L" level signal when the output voltage of the error amplifier 11 is lower than the triangular wave voltage. As described above, the error amplifier 11 uses the voltage of the capacitor C12 as its reference voltage until the output voltage of the DC/DC apparatus reaches the rated voltage VO1. Accordingly, the output voltage of the DC/DC apparatus exhibits 0V at the point of time T0 and exhibits the rated voltage VO1 at the point of time T1, without depending on lightness or heaviness of the load thereof.

Figure 16:
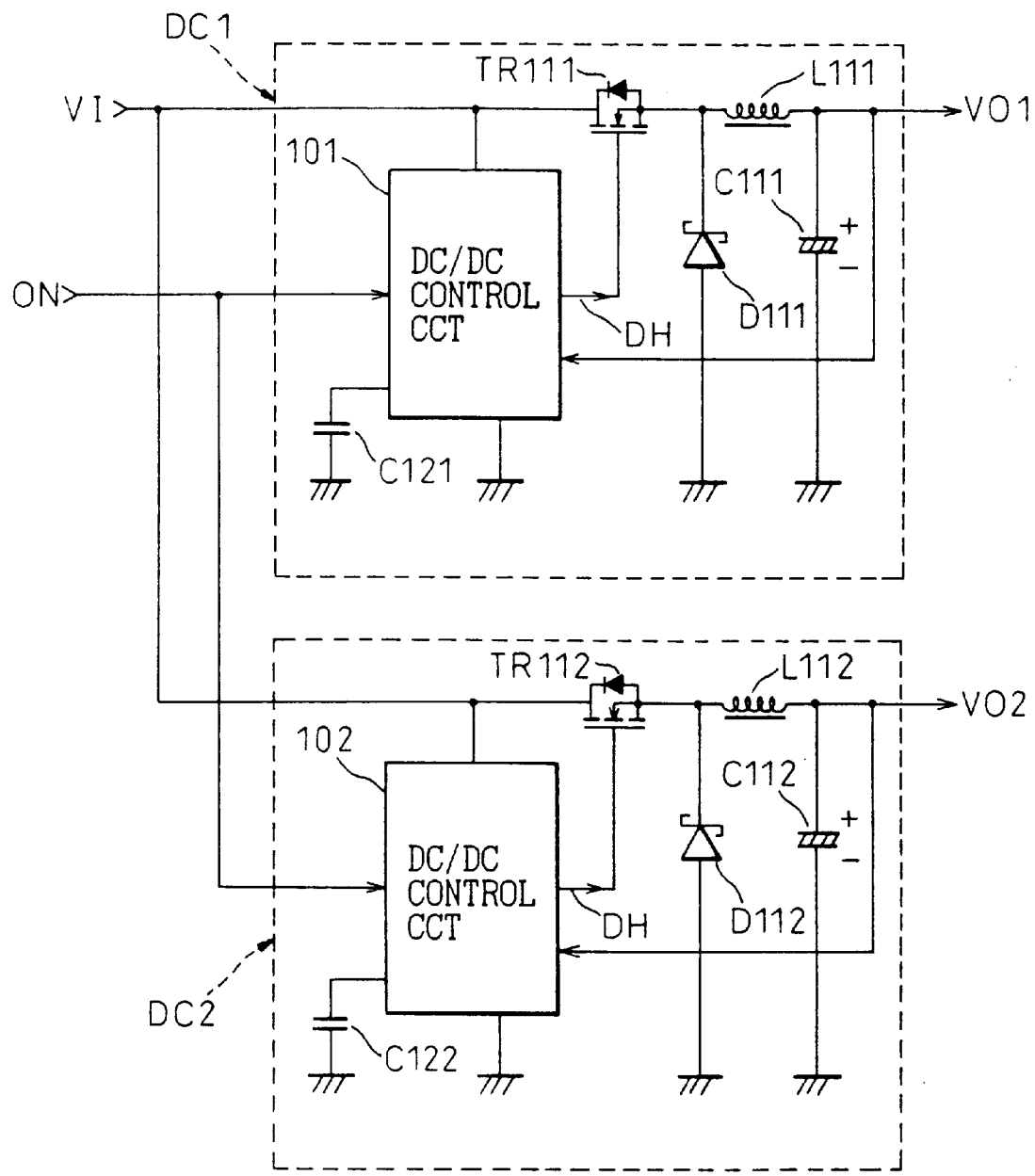
FIG. 16 is a diagram showing the circuit constitution by which a turn-on sequence is controlled between the two power supplies using the DC/DC apparatus according to the first aspect of the present invention.
Figure 17:
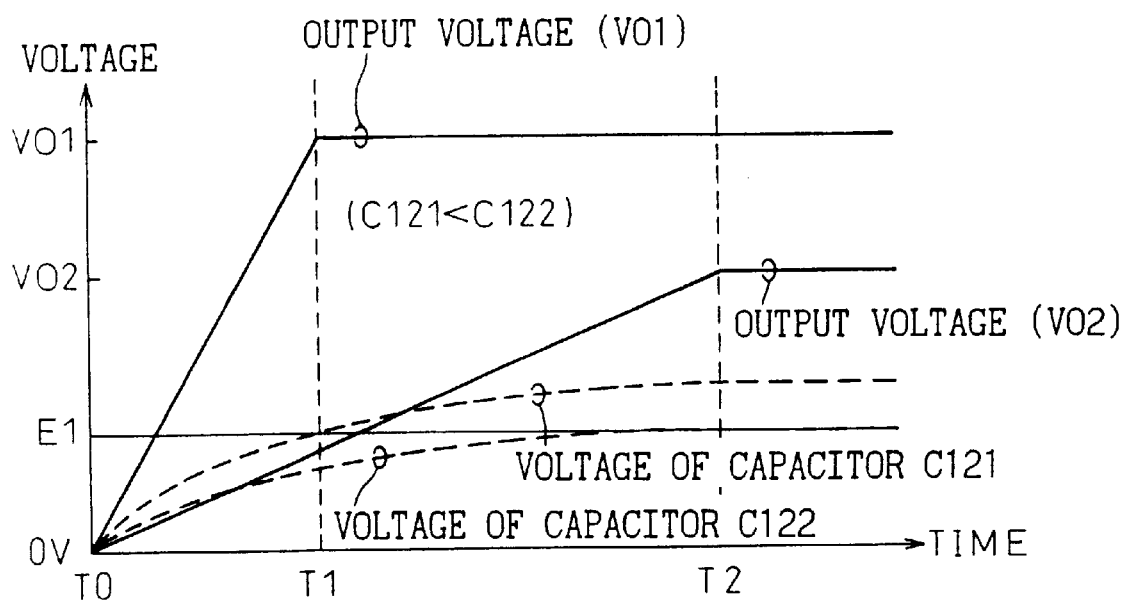
FIG. 17 is an explanatory diagram of the rise characteristics of the output voltages based on the circuit constitution of FIG. 16.

FIG. 16 shows the circuit constitution by which a turn-on sequence is controlled between the two power supplies (the DC/DC apparatuses DC1 and DC2), and FIG. 17 shows the rise characteristics of the output voltages based on the circuit constitution.

In FIG. 16, the constitution of each of the DC/DC apparatuses DC1 and DC2 is the same as that of the DC/DC apparatus shown in FIG. 12a. As described above, the respective rise characteristics of the output voltages VO1 and VO2 of the DC/DC apparatuses DC1 and DC2 are determined by the respective capacitances of the capacitors C121 and C122 without depending on lightness or heaviness of the corresponding loads.

Accordingly, for example, where the power supply to the DC/DC apparatus DC1 is first turned on and the power supply to the DC/DC apparatus DC2 is then turned on, such a power turn-on sequence can be realized by setting the capacitance of the capacitor C121 to be smaller than that of the capacitor C122.

The above will be explained with reference to FIG. 17.

The on/off control signal ON is commonly input to the DC/DC apparatuses DC1 and DC2 so as to simultaneously turn on the respective power supplies thereof. The capacitance of the capacitor C121 is selected so that the output voltage of the DC/DC apparatus DC1 reaches the rated voltage VO1 at a point of time T1, and the capacitance of the capacitor C122 is selected so that the output voltage of the DC/DC apparatus DC2 reaches the rated voltage VO2 at a point of time T2.

When the on/off control signal ON is at "L" level, the respective operations of the DC/DC apparatuses DC1 and DC2 are stopped. When the on/off control signal ON is made "H" level at the point of time T0, the respective power turn-on sequences of the DC/DC apparatuses DC1 and DC2 are simultaneously started. Accordingly, the output voltage of the DC/DC apparatus DCI reaches the rated voltage VO1 at the point of time T1, depending on the capacitance of the capacitor C121, and the output voltage of the DC/DC apparatus DC2 reaches the rated voltage VO2 at the point of time T2, depending on the capacitance of the capacitor C122.

Thus, it is possible to control the respective rise characteristics of the output voltages of the DC/DC apparatuses DC1 and DC2 using only the capacitors C121 and C122.

Figure 18:
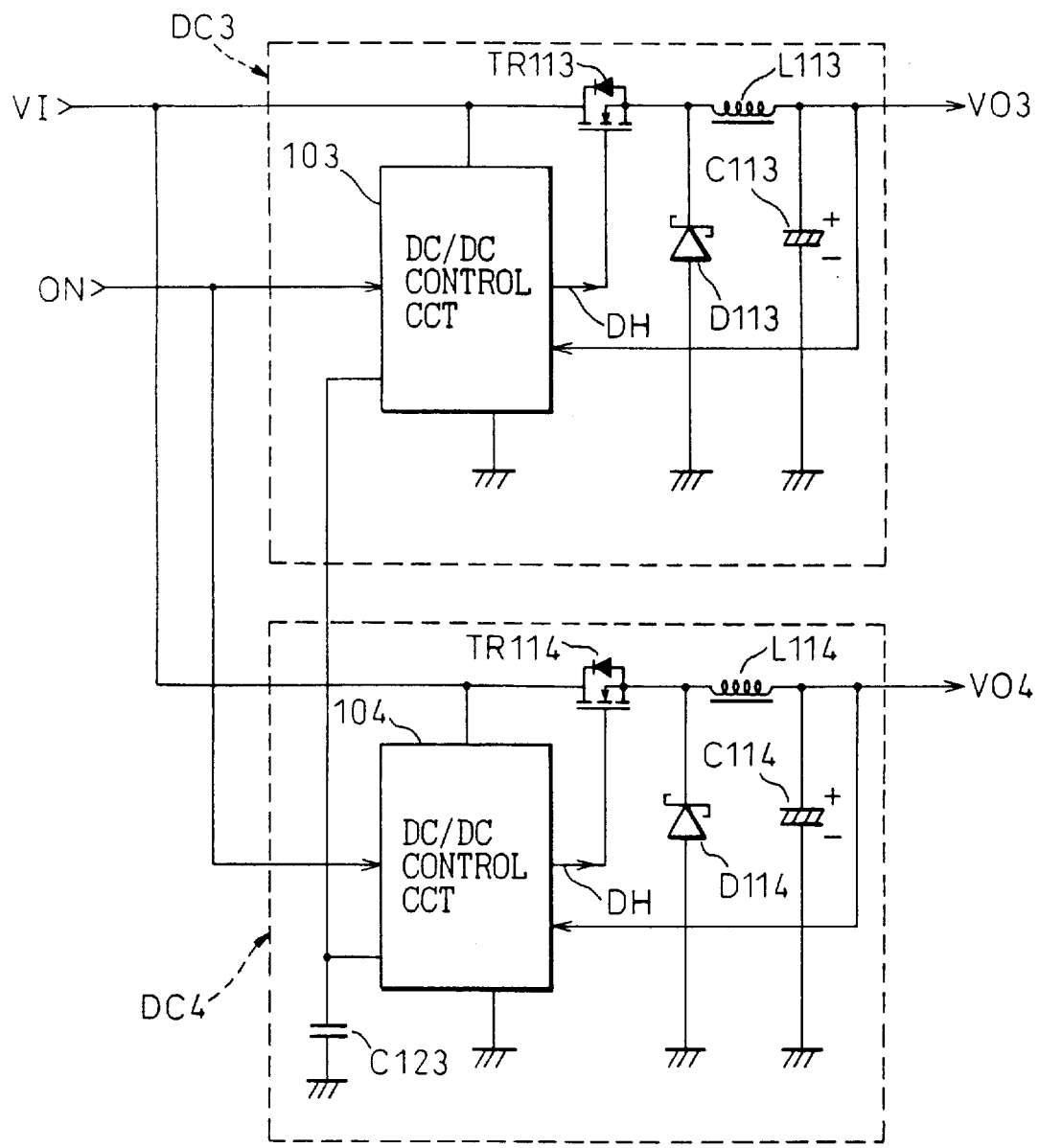
FIG. 18 is a diagram showing the circuit constitution by which the two power supplies are simultaneously turned on using the DC/DC apparatus according to the first aspect of the present invention.
Figure 19:
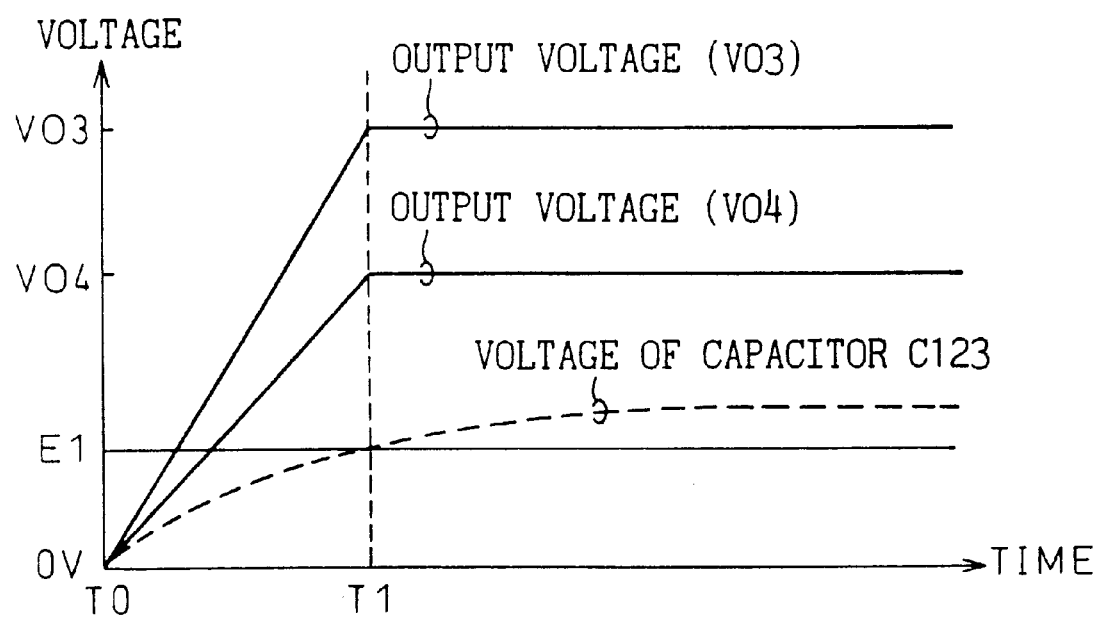
FIG. 19 is an explanatory diagram of the rise characteristics of the output voltages based on the circuit constitution of FIG. 18.

FIG. 18 shows the circuit constitution by which the two power supplies (the DC/DC apparatuses DC3 and DC4) are simultaneously turned on, and FIG. 19 shows the rise characteristics of the output voltages based on the circuit constitution.

In FIG. 18, the on/off control signal ON is commonly input to the DC/DC apparatuses DC3 and DC4 so as to simultaneously turn on the respective power supplies thereof.

When the on/off control signal ON is at "L" level, the respective operations of the DC/DC apparatuses DC3 and DC4 are stopped. When the on/off control signal ON is made "H" level, the respective power turn-on sequences of the DC/DC apparatuses DC3 and DC4 are simultaneously started. At this time, since the capacitor C123 is commonly connected to the DC/DC apparatuses DC3 and DC4, the reference voltage (i.e., voltage of the capacitor C123) of the DC/DC apparatus DC3 and the reference voltage (i.e., voltage of the capacitor C123) of the DC/DC apparatus DC4 begin to rise simultaneously and, after a lapse of certain time, reach the same voltage as the reference voltage E1 simultaneously. Accordingly, the time required until the output voltage of the DC/DC apparatus DC3 reaches the rated voltage VO3 is equal to the time required until the output voltage of the DC/DC apparatus DC4 reaches the rated voltage VO4.

The above will be explained with reference to FIG. 19.

When the on/off control signal ON is made "H" level at a point of time T0, the respective operations of the DC/DC apparatuses DC3 and DC4 are started. Accordingly, the voltage of the capacitor C123 gradually rises and reaches the same voltage as the reference voltage E1 at a point of time T1. The output voltage of the DC/DC apparatus DC3 also gradually rises and reaches the rated voltage VO3 at the point of time T1, and the output voltage of the DC/DC apparatus DC4 also gradually rises and reaches the rated voltage VO4 at the point of time T1.

As explained above, where a turn-on sequence between a plurality of power supplies (DC/DC apparatuses) must be taken into consideration, such a power turn-on sequence can be easily controlled by setting the capacitance of the capacitor of a DC/DC apparatus to which the power supply is first turned on, to be smaller than that of the capacitor of a DC/DC apparatus to which the power supply is next turned on. Accordingly, it becomes unnecessary to provide a special logic circuit for the power turn-on sequence control as required in the prior art.

Also, by providing the capacitor C123 commonly to the two DC/DC apparatuses as shown in FIG. 18, it is possible to realize the same rise characteristics with respect to the respective DC/DC apparatuses, without depending on lightness or heaviness of the respective loads.

Figure 20A:
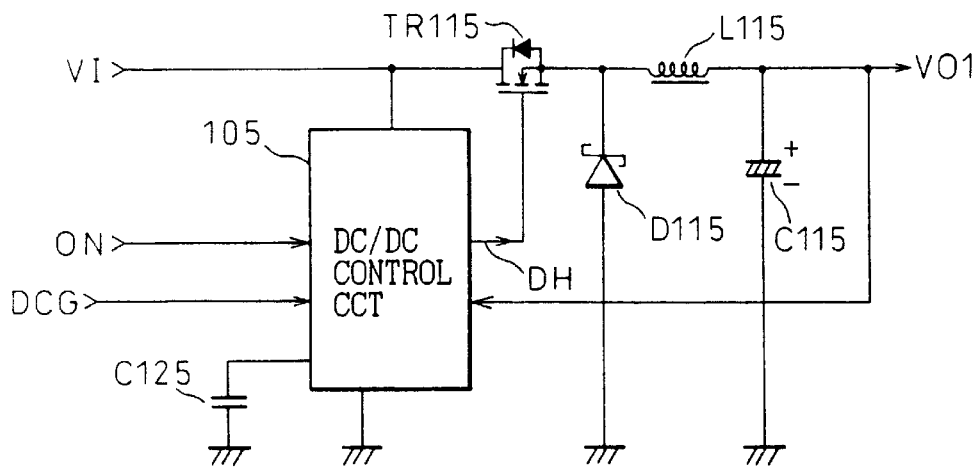
FIGS. 20a and 20b are diagrams showing the circuit constitution of the DC/DC apparatus by which a power turn-off sequence is controlled based on the first aspect of the present invention.
Figure 20B:
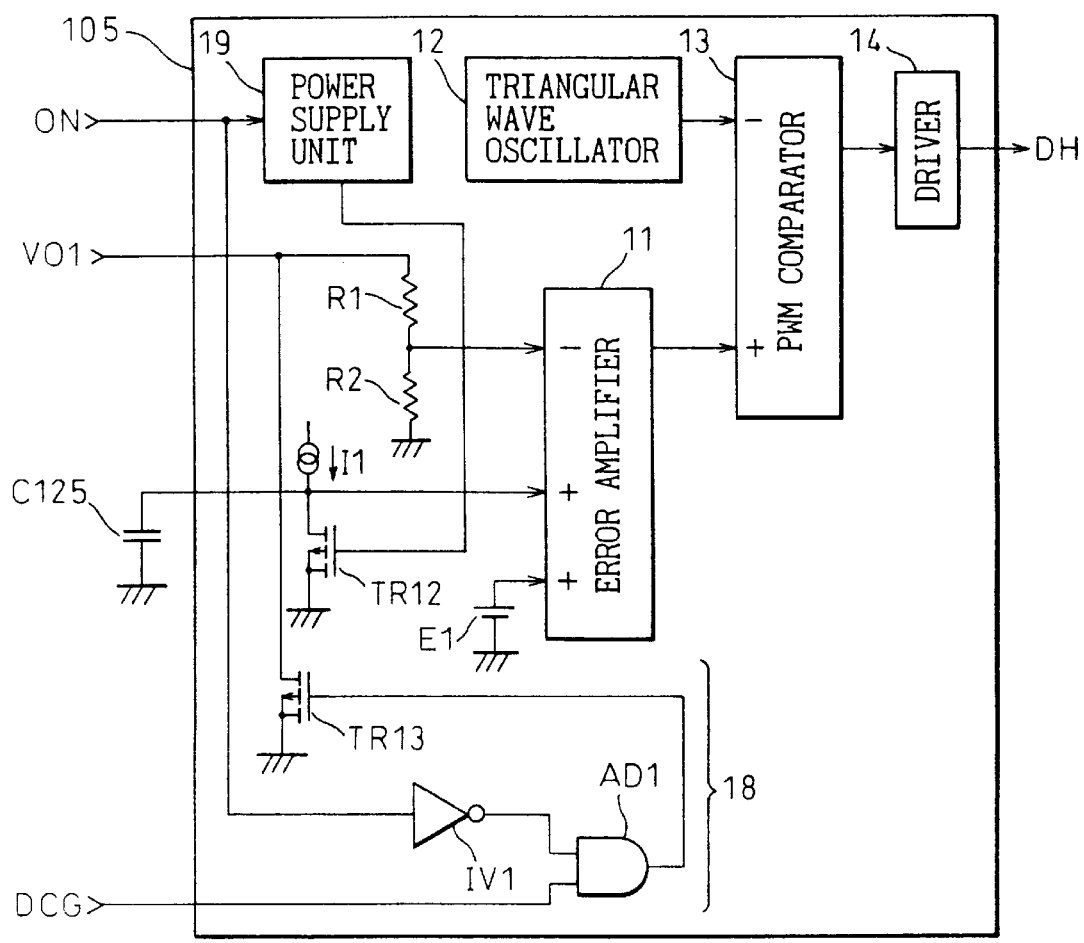
Figure 21:
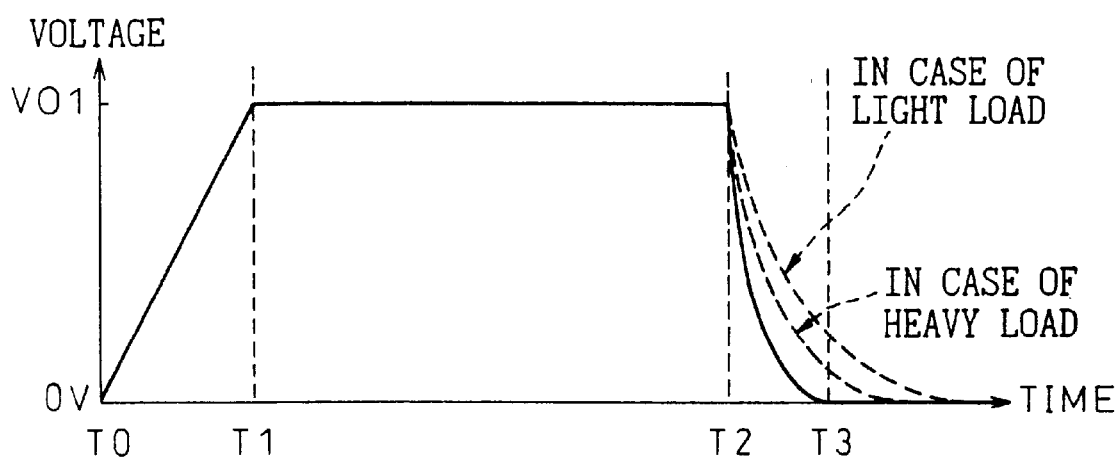
FIG. 21 is an explanatory diagram of the fall characteristics of the output voltage based on the circuit constitution of FIGS. 20a and 20b.

FIGS. 20a and 20b show the circuit constitution of the DC/DC apparatus by which a power turn-off sequence is controlled based on the first aspect of the present invention, and FIG. 21 shows the fall characteristics of the output voltage based on the circuit constitution.

The constitution of the DC/DC apparatus shown in FIG. 20a is the same as that of the DC/DC apparatus shown in FIG. 12a, except that a discharging control signal DCG indicating validity or invalidity of the discharging of charges corresponding to the load capacitance is input to a DC/DC control circuit 105. As shown in FIG. 20b, the DC/DC control circuit 105 includes a load capacitance discharging circuit 18. In FIG. 20b, circuit portions other than the load capacitance discharging circuit 18 are the same as the corresponding portions of the DC/DC control circuit 100 shown in FIG. 12b, and thus the explanation thereof is omitted.

In FIG. 20b, reference IV1 denotes an inverter responsive to the on/off control signal ON; reference AD1 denotes an AND gate responsive to an output of the inverter IV1 and the discharging control signal DCG; and reference TR13 denotes a transistor responsive to an output of the AND gate AD1. When the output of the AND gate AD1 is at "H" level, the transistor TR13 is turned on to short-circuit the output end (VO1) of the DC/DC apparatus to the ground to thereby forcibly discharge charges corresponding to the load capacitance.

When the on/off control signal ON is at "H" level, or when the discharging control signal DCG is at "L" level, the AND gate AD1 outputs a "L" level signal and thus the transistor TR13 is turned off. Accordingly, in this case, the operation of the DC/DC control circuit 105 is the same as the operation obtained when the load capacitance discharging circuit 18 is not provided.

On the other hand, when the on/off control signal ON is at "L" level and the discharging control signal DCG is at "H" level, the AND gate AD1 outputs a "H" level signal and thus the transistor TR13 is turned on. Accordingly, in this case, the output voltage VO1 of the DC/DC apparatus is rapidly lowered to 0V without depending on the load thereof since the charges corresponding to the output voltage are discharged through the transistor TR13.

The above will be explained with reference to FIG. 21.

When the on/off control signal ON is made "H" level at a point of time T0, the operation of the DC/DC apparatus is started. Accordingly, the voltage of the capacitor C125 gradually rises and reaches the same voltage as the reference voltage E1 at a point of time T1.

The output voltage of the DC/DC apparatus also gradually rises and reaches the rated voltage VO1 at the point of time T1.

Next, when the on/off control signal ON is made "L" level at a point of time T2, the operation of the DC/DC apparatus is stopped. At this time, the output end (VO1) of the DC/DC apparatus is short-circuited to the ground by the transistor TR13 and thus the charges corresponding to the load capacitance are forcibly discharged. As a result, the output voltage VO1 of the DC/DC apparatus reaches 0V at a point of time T3.

Contrary to this, the prior art DC/DC apparatus is not provided with the above load capacitance discharging circuit 18. Accordingly, as shown by broken lines in FIG. 21, the off time required until the output voltage of the DC/DC apparatus reaches 0V differs between the case of light load and the case of heavy load. According to the present embodiment, it is possible to make the off time constant without depending on lightness or heaviness of the load.

Figure 22A:
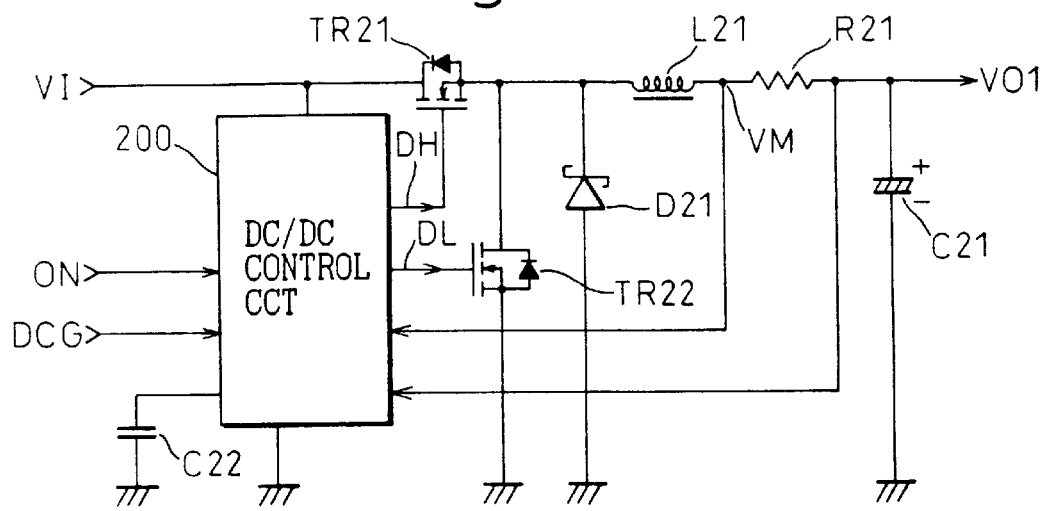
FIGS. 22a and 22b are diagrams showing the circuit constitution of an embodiment of the DC/DC apparatus according to the second aspect of the present invention.
Figure 22B:
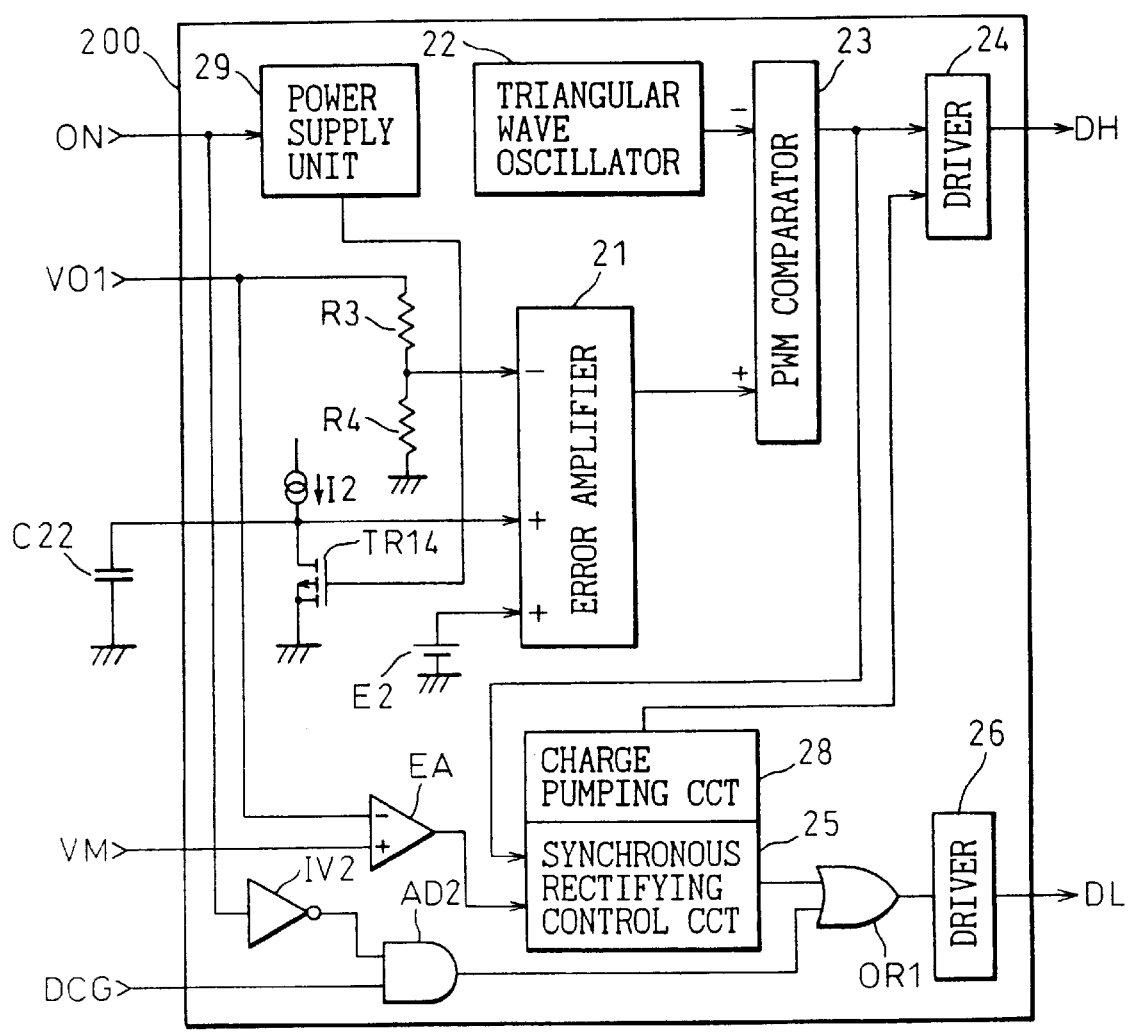

FIGS. 22a and 22b show the circuit constitution of an embodiment (DC/DC apparatus using a synchronous rectifying control) of the DC/DC apparatus according to the second aspect of the present invention.

FIG. 22a shows the constitution of the entire DC/DC apparatus. In FIG. 22a, reference TR21 denotes a switching transistor which is turned on/off in response to an output DH of the DC/DC control circuit 200; reference L21 denotes a choke coil for converting an input voltage VI to an output voltage VO1; reference D21 denotes a fly-wheel diode for releasing energy accumulated in the choke coil L21 when the transistor TR21 is in off state; references R21 denotes a resistor for sensing current to be fed to the load from the present DC/DC apparatus; reference C21 denotes a smoothing capacitor; reference C22 denotes a soft start capacitor; and reference TR22 denotes a synchronous rectifying transistor which is turned on/off in response to an output DL of the DC/DC control circuit 200. The synchronous rectifying transistor TR22 is turned on when a voltage is applied across the diode D21 in the forward direction, and is turned off when a voltage is applied across the diode D21 in the reverse direction. The synchronous rectifying transistor TR22 has the function of releasing energy accumulated in the choke coil L21 when the switching transistor TR21 is in off state.

FIG. 22b shows the constitution of the DC/DC control circuit 200. In FIG. 22b, references R3 and R4 each denote a resistor for dividing the output voltage VO1 of the DC/DC apparatus; reference 21 denotes an error amplifier for amplifying a difference between the voltage divided by the resistors R3 and R4 and one of a plurality of reference voltages (in the illustrated example, a voltage of the capacitor C22 and a reference voltage E2); reference 22 denotes a triangular wave oscillator for oscillating a triangular wave signal at a constant frequency; and reference 23 denotes a PWM comparator for controlling an on period of its output pulse according to an output voltage of the error amplifier 21. The PWM comparator 23 compares a voltage of the triangular wave signal from the oscillator 22 with the output voltage of the error amplifier 21, and is brought to on state (or off state) when the voltage of the triangular wave signal is lower (or higher) than the output voltage of the error amplifier 21.

Also, reference IV2 denotes an inverter responsive to the on/off control signal ON; reference AD2 denotes an AND gate responsive to an output of the inverter IV2 and the discharging control signal DCG; reference EA denotes an error amplifier for detecting a voltage difference across the current sense resistor R21; and reference 25 denotes a synchronous rectifying control circuit responsive to an output of the error amplifier EA and an output of the PWM comparator 23. The synchronous rectifying control circuit 25 outputs a "H" level signal when the PWM comparator 23 is in off state and the output of the error amplifier EA is below a predetermined level.

Also, reference 28 denotes a charge pumping circuit for generating voltages necessary to turn on the switching transistor TR21 and the synchronous rectifying transistor TR22; reference OR1 denotes an OR gate responsive to an output of the synchronous rectifying control circuit 25 and an output of the AND gate AD2; reference 24 denotes a driver for turning on the switching transistor TR21 based on the voltage generated by the charge pumping circuit 28 when the PWM comparator 23 is in on state; and reference 26 denotes a driver for turning on the synchronous rectifying transistor TR22 in response to an output of the OR gate OR1.

Also, reference 29 denotes a power supply unit which responds to the on/off control signal ON and controls on/off of the power supply to the DC/DC control circuit 200 to thereby control on/off (start/stop of the operation) of the entire DC/DC apparatus. Also, reference TR14 denotes a transistor for discharging charges of the capacitor C22 to set the terminal voltage thereof to 0 V when the operation of the DC/DC apparatus is stopped; and reference I2 denotes a constant current source for charging the capacitor C22 to raise the terminal voltage thereof in a constant time when the transistor TR14 is in off state.

Hereinafter, the explanation as to the load capacitance discharging control circuit constituted by the inverter IV2, the AND gate AD2 and the OR gate OR1 will be given.

In FIG. 22b, the DC/DC control circuit 200 starts its operation when the on/off control signal ON is at "H" level, and stops its operation when the on/off control signal ON is at "L" level. Also, the load capacitance discharging function is validated when the discharging control signal DCG is at "H" level, and is invalidated when the discharging control signal DCG is at "L" level.

When the on/off control signal ON is at "H" level, the inverter IV2 outputs a "L" level signal and thus the AND gate AD2 outputs a "L" level signal. Accordingly, the OR gate OR1 outputs the output signal of the synchronous rectifying control circuit 25 to the driver 26. As a result, no influence is exerted on the operation of the entire DC/DC control circuit 200.

Also, when the on/off control signal ON is at "L" level and the discharging control signal DCG is at "L" level, the AND gate AD2 outputs a "L" level signal. Accordingly, the OR gate OR1 outputs the output signal of the synchronous rectifying control circuit 25 to the driver 26. As a result, no influence is exerted on the operation of the entire DC/DC control circuit 200.

On the other hand, when the on/off control signal ON is at "L" level and the discharging control signal DCG is at "H"

level, the AND gate AD2 outputs a "H" level signal and thus the OR gate OR1 outputs a "H" level signal. As a result, the driver 26 is enabled to turn on the synchronous rectifying transistor TR22. When the transistor TR22 is turned on, the output end of the DC/DC apparatus is short-circuited via the transistor TR22 to the ground and thus the charges corresponding to the load capacitance are forcibly discharged. Therefore, it is possible to lower the output voltage of the DC/DC apparatus to 0V in a substantially constant time, without depending on lightness or heaviness of the load of the DC/DC apparatus.

Figure 23:
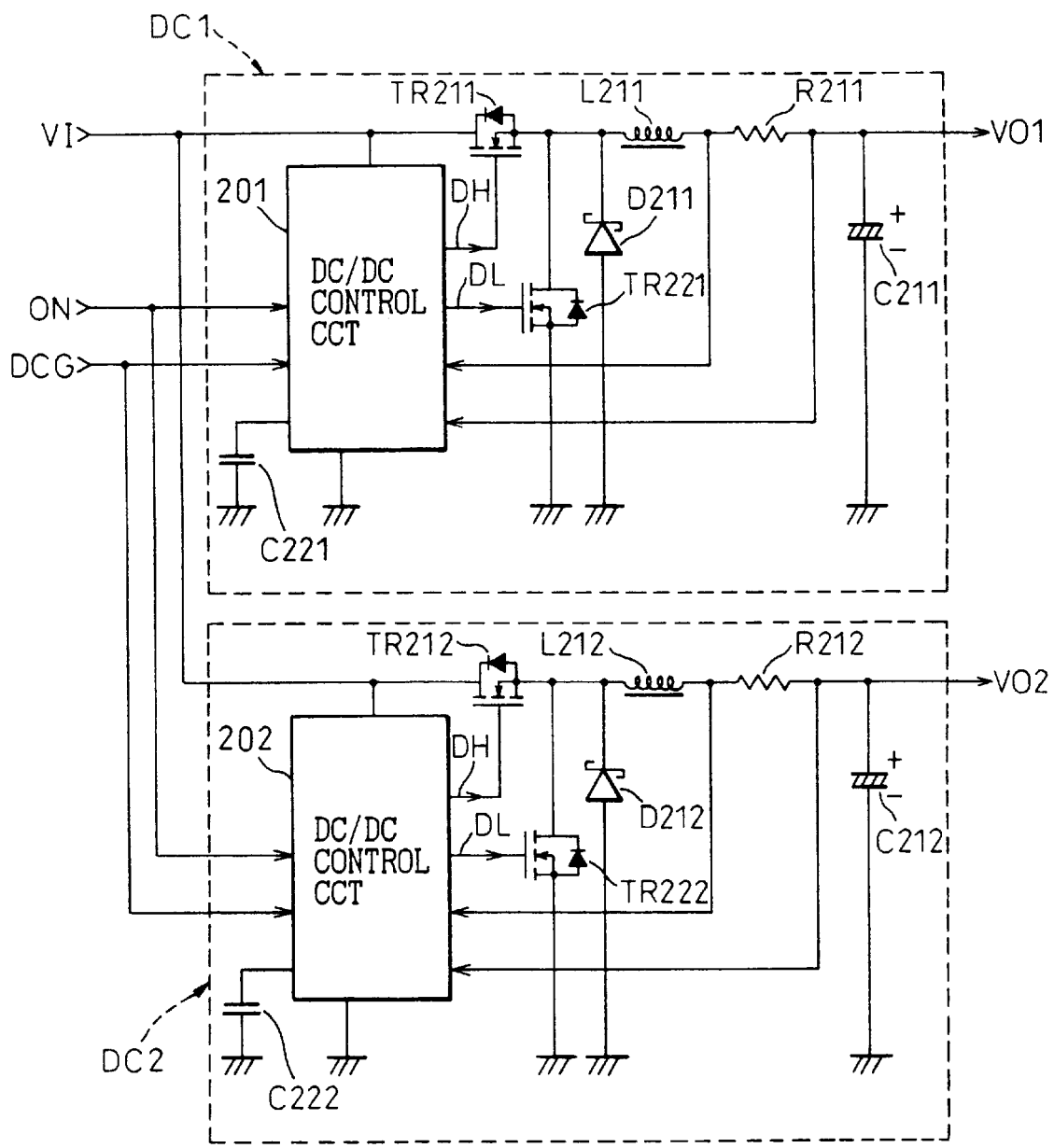
FIG. 23 is a diagram showing the circuit constitution by which turn-on/turn-off sequences are controlled between the two power supplies using the DC/DC apparatus according to the second aspect of the present invention.
Figure 24:
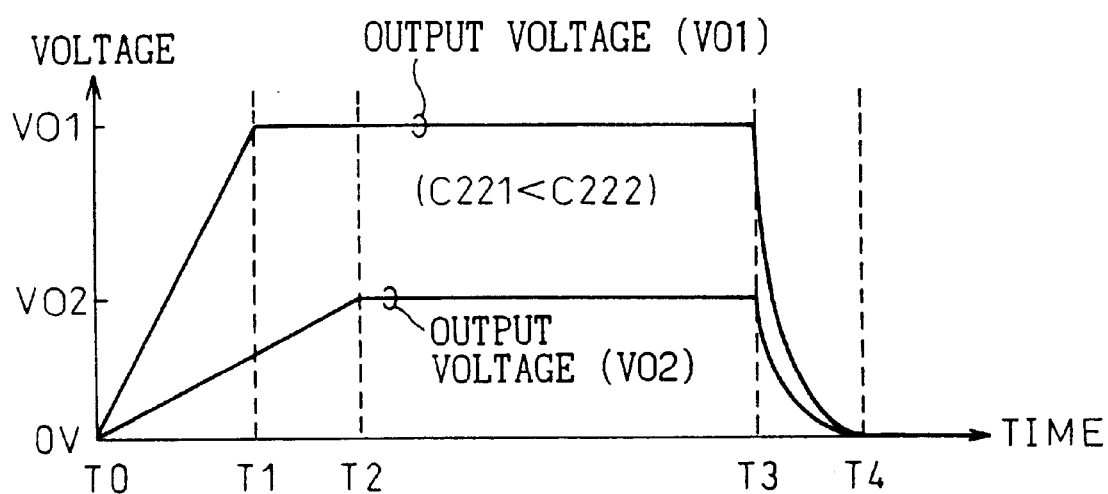
FIG. 24 is an explanatory diagram of the rise/fall characteristics of the output voltages based on the circuit constitution of FIG. 23.

FIG. 23 shows the circuit constitution by which turn-on/turn-off sequences are controlled between the two power supplies (the DC/DC apparatuses DC1 and DC2), and FIG. 24 shows the rise/fall characteristics of the output voltages based on the circuit constitution.

In FIG. 23, the constitution of each of the DC/DC apparatuses DC1 and DC2 is the same as that of the DC/DC apparatus shown in FIG. 22a.

The power turn-on sequence control with respect to the DC/DC apparatuses DC1 and DC2 is as explained with reference to FIG. 16. Namely, the respective rise characteristics of the output voltages VO1 and VO2 of the DC/DC apparatuses DC1 and DC2 are determined by the respective capacitances of the capacitors C221 and C222 without depending on lightness or heaviness of the corresponding loads.

Accordingly, for example, where the power supply to the DC/DC apparatus DC1 is first turned on and the power supply to the DC/DC apparatus DC2 is then turned on, such a power turn-on sequence can be realized by setting the capacitance of the capacitor C221 to be smaller than that of the capacitor C222.

Also, the power turn-off sequence control with respect to the DC/DC apparatuses DC1 and DC2 is as explained with reference to FIGS. 22a and 22b.

The above will be explained with reference to FIG. 24.

The on/off control signal ON is commonly input to the DC/DC apparatuses DC1 and DC2 so as to simultaneously turn on the respective power supplies thereof. The discharging control signal DCG is also commonly input to the DC/DC apparatuses DC1 and DC2 and is set to "H" level. The capacitance of the capacitor C221 is selected so that the output voltage of the DC/DC apparatus DC1 reaches the rated voltage VO1 at a point of time T1, and the capacitance of the capacitor C222 is selected so that the output voltage of the DC/DC apparatus DC2 reaches the rated voltage VO2 at a point of time T2.

When the on/off control signal ON is at "L" level, the respective operations of the DC/DC apparatuses DC1 and DC2 are stopped. When the on/off control signal ON is made "H" level at the point of time T0, the respective power turn-on sequences of the DC/DC apparatuses DC1 and DC2 are simultaneously started. Accordingly, the output voltage of the DC/DC apparatus DC1 reaches the rated voltage VO1 at the point of time T1, depending on the capacitance of the capacitor C221, and the output voltage of the DC/DC apparatus DC2 reaches the rated voltage VO2 at the point of time T2, depending on the capacitance of the capacitor C222.

Next, when the on/off control signal ON is changed from "H" level to "L" level at the point of time T3, the respective operations of the DC/DC apparatuses DC1 and DC2 are simultaneously stopped. At this time, the discharging control signal DCG is at "H" level and thus the respective synchronous rectifying transistors TR221 and TR222 are turned on. As a result, the respective output ends of the DC/DC apparatuses DC1 and DC2 are short-circuited to the ground and thus the charges corresponding to the respective load capacitances are forcibly discharged.

Thus, the output voltage of the DC/DC apparatus DC1 and the output voltage of the DC/DC apparatus DC2 can simultaneously reach 0V at the point of time T4.

Figure 25:
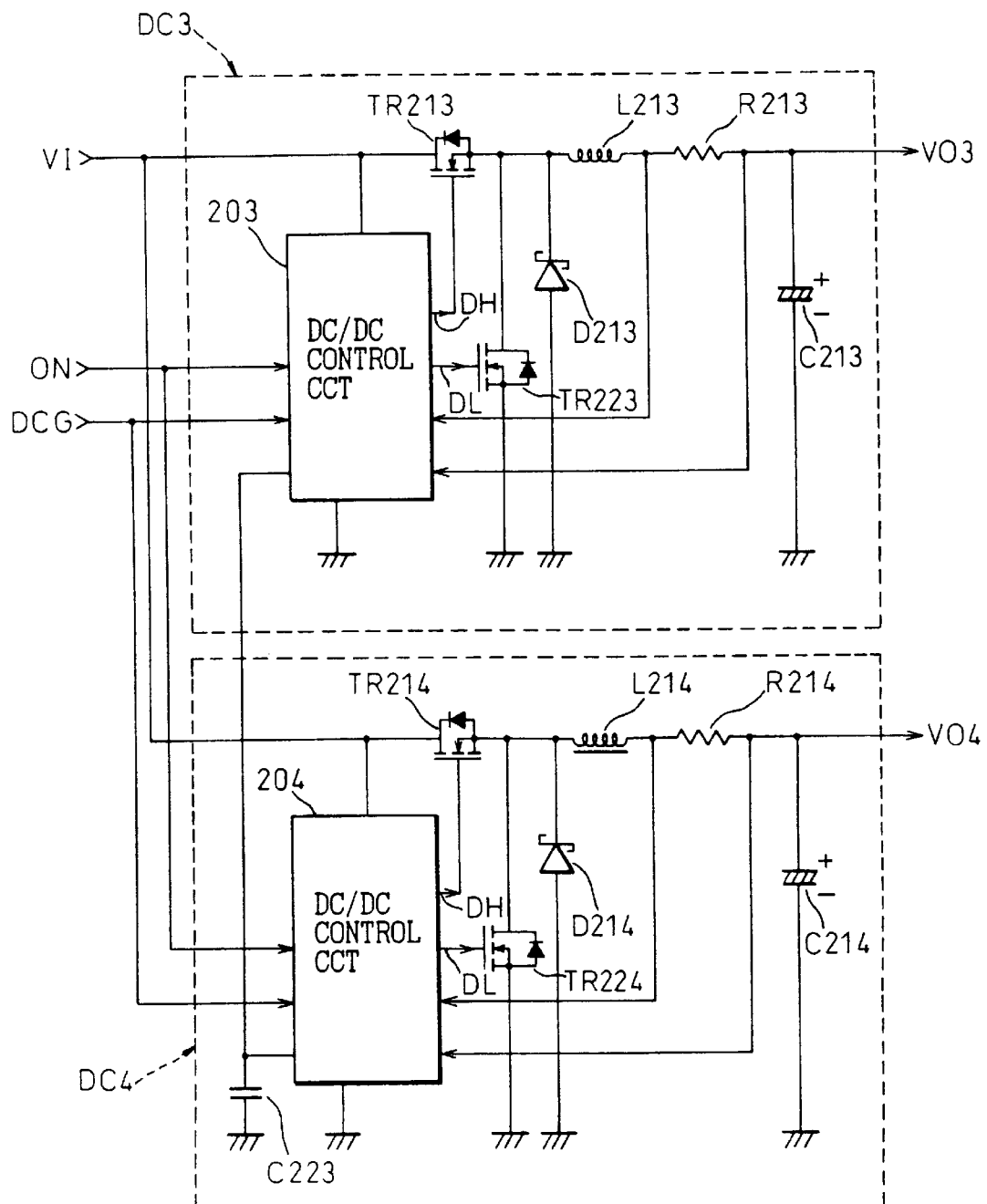
FIG. 25 is a diagram showing the circuit constitution by which the two power supplies are simultaneously turned on/off using the DC/DC apparatus according to the second aspect of the present invention.
Figure 26:
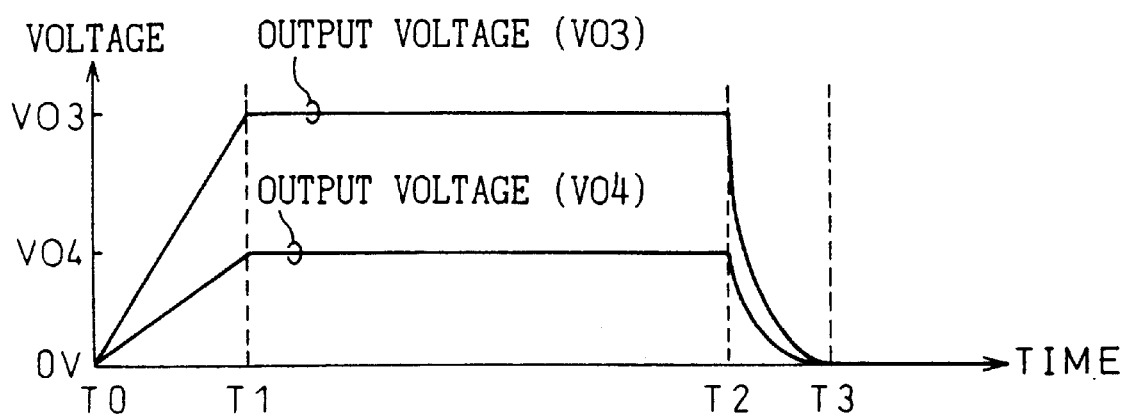
FIG. 26 is an explanatory diagram of the rise/fall characteristics of the output voltages based on the circuit constitution of FIG. 25.

FIG. 25 shows the circuit constitution by which the two power supplies (the DC/DC apparatuses DC3 and DC4) are simultaneously turned on/off, and FIG. 26 shows the rise/fall characteristics of the output voltages based on the circuit constitution.

In FIG. 25, the on/off control signal ON is commonly input to the DC/DC apparatuses DC3 and DC4 so as to simultaneously turn on the respective power supplies thereof. The discharging control signal DCG is also commonly input to the DC/DC apparatuses DC3 and DC4 and is set to "H" level.

When the on/off control signal ON is at "L" level, the respective operations of the DC/DC apparatuses DC3 and DC4 are stopped. When the on/off control signal ON is made "H" level, the respective power turn-on sequences of the DC/DC apparatuses DC3 and DC4 are simultaneously started. At this time, since the capacitor C223 is commonly connected to the DC/DC apparatuses DC3 and DC4, the reference voltage (i.e., voltage of the capacitor C223) of the DC/DC apparatus DC3 and the reference voltage (i.e., voltage of the capacitor C223) of the DC/DC apparatus DC4 begin to rise simultaneously and, after a lapse of certain time, reach the same voltage as the reference voltage E2 simultaneously.

The above will be explained with reference to FIG. 26.

When the on/off control signal ON is made "H" level at a point of time T0, the respective operations of the DC/DC apparatuses DC3 and DC4 are started. Accordingly, the voltage of the capacitor C223 gradually rises and reaches the same voltage as the reference voltage E2 at a point of time T1. The output voltage of the DC/DC apparatus DC3 also gradually rises and reaches the rated voltage VO3 at the point of time T1, and the output voltage of the DC/DC apparatus DC4 also gradually rises and reaches the rated voltage VO4 at the point of time T1.

Next, when the on/off control signal ON is changed from "H" level to "L" level at the point of time T2, the respective operations of the DC/DC apparatuses DC3 and DC4 are simultaneously stopped. At this time, the discharging control signal DCG is at "H" level and thus the respective synchronous rectifying transistors TR223 and TR224 are turned on. As a result, the respective output ends of the DC/DC apparatuses DC3 and DC4 are short-circuited to the ground and thus the charges corresponding to the respective load capacitances are forcibly discharged.

Thus, the output voltage of the DC/DC apparatus DC3 and the output voltage of the DC/DC apparatus DC4 can simultaneously reach 0V at the point of time T3.

What is claimed is:

1. A control circuit having an error amplifier for voltage control and controlling a direct-current to direct-current conversion based on a pulse width modulation control using an output of said error amplifier, the error amplifier comprising:

a first input terminal for inputting a voltage signal corresponding to an output voltage of a result of said direct-current to direct-current conversion;

a second input terminal for inputting a predetermined reference voltage signal;

a third input terminal for inputting a reference voltage signal used as a soft start signal when a power supply to said control circuit is turned on; and an amplifier for amplifying a difference between a voltage signal input from said first input terminal and a voltage signal of a lower potential among voltage signals input from said second and third input terminals, wherein said pulse width modulation control is carried out based on an output of the amplifier.

2. The control circuit as set forth in claim 1, further comprising a discharging circuit for discharging charges corresponding to the output voltage of a result of said direct-current to direct-current conversion to be input to the first input terminal of said error amplifier when a power supply to said control circuit is turned off.

3. The control circuit as set forth in claim 2, further comprising a unit inputting a discharging control signal indicating validity or invalidity of the discharging with respect to said discharging circuit, wherein the discharging circuit is operated when the validity of the discharging is indicated.

4. An apparatus for effecting a direct-current to direct-current conversion, comprising:
a control circuit having an error amplifier for voltage control and controlling direct-current to direct-current conversion based on a pulse width modulation control using an output of said error amplifier, the error amplifier including a first input terminal for inputting a voltage signal corresponding to an output voltage of a result of said direct-current to direct-current conversion, a second input terminal for inputting a predetermined reference voltage signal, a third input terminal for inputting a reference voltage signal used as a soft start signal when a power supply to said control circuit is turned on, and an amplifier for amplifying a difference between a voltage signal input from said first input terminal and a voltage signal of a lower potential among voltage signals input from said second and third input terminals, wherein said pulse width modulation control is carried out based on an output of the amplifier; and
a capacitor connected to the third input terminal of said error amplifier and providing the reference voltage used as said soft start signal, said reference voltage being changed continuously between zero volt and a rated voltage.

5. The apparatus as set forth in claim 4, wherein a plurality of control circuits each being said control circuit are provided and a plurality of capacitors each being said capacitor are provided to correspond to the plurality of control circuits on one-to-one basis, respective capacitance values being changed between the plurality of capacitors.

6. The apparatus as set forth in claim 5, wherein the respective capacitance values of said plurality of capacitors are set so that capacitance values of corresponding capacitors are sequentially made small according to a turn-on sequence of respective power supplies to said plurality of control circuits.

7. The apparatus as set forth in claim 4, wherein a plurality of control circuits each being said control circuit are provided and said capacitor is provided to be shared by the plurality of control circuits, and wherein, based on a time constant determined by a capacitance value of the capacitor, rise times of respective output current conversion controlled by said plurality of control circuits are controlled.

8. The control circuit as set forth in claim 3, further comprising a discharging circuit for discharging charges corresponding to the output voltage, input as the voltage signal to the first input terminal of said error amplifier, when a power supply to said control circuit is turned off.

9. The control circuit as set forth in claim 8, further comprising a circuit inputting a discharging control signal indicating validity or invalidity of the discharging with respect to said discharging circuit, the discharging circuit being operated when the discharging is valid.

10. The control circuit as set forth in claim 1, further comprising a circuit inputting a discharging control signal indicating validity or invalidity of the discharging with respect to said discharging circuit, wherein the discharging circuit operates only when the discharging is valid.

11. A control circuit controlling a direct-current to direct-current conversion by pulse width modulation control using an output of an amplifier, the amplifier comprising:
a first input terminal inputting a voltage signal corresponding to an output voltage of said direct-current to direct-current conversion;
a second input terminal inputting a predetermined reference voltage signal;
a third input terminal inputting a reference voltage signal used as a soft start signal when a power supply to said control circuit is turned on; and
the amplifier amplifying a difference between the voltage signal input from said first input terminal and a lower potential one of the respective voltage signals input by said second and third input terminals and producing an output, wherein said pulse width modulation control is carried out based on the output of the amplifier.

12. An apparatus, comprising:
a control circuit controlling a direct-current to direct-current conversion by pulse width modulation control using an output of an amplifier, the amplifier further comprising:
a first input terminal inputting a voltage signal corresponding to an output voltage of said direct-current to direct-current conversion,
a second input terminal inputting a predetermined reference voltage signal,
a third input terminal inputting a reference voltage signal used as a soft start signal when a power supply to said control circuit is turned on, and
the amplifier amplifying a difference between the voltage signal input from said first input terminal and a lower potential one of the respective voltage signals input by said second and third input terminals and producing an output, wherein said pulse width modulation control is carried out based on the output of the amplifier; and
a capacitor connected to the third input terminal of said error amplifier and providing the reference voltage used as said soft start signal, said reference voltage being changed continuously between zero volts and a rated voltage.

13. The apparatus as set forth in claim 12, comprising plural said control circuits and plural said capacitors respectively corresponding to the plural control circuits and having mutually different capacitance values.

14. The apparatus as set forth in claim 13, wherein said plural capacitors have respective, sequentially smaller capacitance values corresponding to a turn-on sequence of respective power supplies to said plural control circuits.

15. The apparatus as set forth in claim 12, comprising plural said control circuits, the capacitor being connected in common to the respective third input terminals thereof and a time constant determined by the capacitance value of the capacitor controls the respective rise times of the respective output current conversions respectively controlled by the plural control circuits.

16. A control circuit producing a pulse width modulation control signal for controlling a converter circuit which converts a direct current input voltage to a different, direct current output voltage, comprising:

an amplifier receiving a first voltage signal corresponding to the direct-current output voltage as a first input, a predetermined reference voltage signal as a second input and a reference voltage signal, used as a soft start signal when a power supply to the control circuit is turned on, as a third input, and producing, as an output thereof, a difference signal representing a difference between the first input and a lower potential one of the second and third inputs; and the control circuit producing the pulse width modulation control signal in accordance with the difference signal output of the amplifier.

17. A control circuit as recited in claim 16, further comprising:

a pulse width modulation circuit receiving, and pulse width modulating, an input voltage signal of a triangular waveform in accordance with the difference signal output of the amplifier.

18. A control circuit having an error amplifier for voltage control and controlling a direct-current to direct-current conversion based on a pulse width modulation control, comprising:

first input means for inputting a voltage signal corresponding to an output voltage resulting from said direct-current to direct-current conversion;

second input means for inputting a predetermined reference voltage signal;

third input means for inputting a reference voltage signal used as a soft start signal when a direct-current to direct-current conversion starts; and error amplifier means for amplifying a difference between a voltage signal input from said first input means and a voltage signal of a lower potential among voltage signals input from said second and third input means, said pulse width modulation control being carried out based on an output of the error amplifier means.

19. An apparatus for effecting a direct-current to direct-current conversion, comprising:

control means, having an error amplifier means for providing voltage control, for controlling direct-current to direct-current conversion based on a pulse width modulation control using an output of said error amplifier means, the error amplifier means including first input means for inputting a voltage signal corresponding to an output voltage of a result of said direct-current to direct-current conversion, second input means for inputting a predetermined reference voltage signal and third input means for inputting a reference voltage signal used as a soft start signal when a direct-current to direct current conversion starts, the error amplifier means amplifying a difference between a voltage signal input from said first input means and a voltage signal of a lower potential among voltage signals input from said second and third input means, said pulse width modulation control being carried out based on an output of said error amplifier means; and capacitor means, connected to the third input means, for providing the reference voltage used as said soft start signal, said reference voltage being changed continuously between zero volt and a rated voltage.

20. An apparatus for effecting a direct-current to direct-current conversion using a synchronous rectifying control, comprising:

synchronous rectifying transistor means, provided between ground and a line on which an output voltage of a result of said direct-current to direct-current conversion appears, discharging charges corresponding to the output voltage produced by said direct-current to direct-current conversion; and control circuit means for controlling an on/off operation of said synchronous rectifying transistor means and including a discharging control circuit means for turning on said synchronous rectifying transistor means when a direct-current to direct-current conversion stops, wherein said control circuit means further comprises an error amplifier means for performing voltage control, the error amplifier means including a first input means for inputting a voltage signal corresponding to the output voltage of a result of said direct-current to direct-current conversion, a second input means for inputting a predetermined reference voltage signal, a third input means for inputting a reference voltage signal used as a soft start signal when a direct-current to direct-current conversion starts, the error amplifier means amplifying a difference between a voltage signal input from said first input means and a voltage signal of a lower potential, among voltage signals input from said second and third input means, and the pulse width modulation control being based on an output of the error amplifier means and controlling the on/off operation of said synchronous rectifying transistor means, and wherein said apparatus further comprises capacitor means connected to the third input means of said error amplifier means and providing the reference voltage used as said soft start signal.

21. A control circuit controlling a direct-current to direct-current conversion by pulse width modulation control, comprising:

first input means for inputting a voltage signal corresponding to an output voltage of said direct-current to direct-current conversion;

second input means for inputting a predetermined reference voltage signal;

third input means for inputting a reference voltage signal used as a soft start signal when a direct-current to direct-current conversion starts; and amplifier means for amplifying a difference between the voltage signal input from said first input means and a lower potential one of the respective voltage signals input by said second and third input means and producing an output, said pulse width modulation control being carried out based on the output of the amplifier means.

22. An apparatus, comprising:

control circuit means for controlling a direct-current to direct-current conversion by pulse width modulation control using an output of an amplifier, the amplifier further comprising:

first input means inputting a voltage signal corresponding to an output voltage of said direct-current to direct-current conversion, second input means inputting a predetermined reference voltage signal, third input means inputting a reference voltage signal used as a soft start signal when a direct-current to direct-current conversion starts, and amplifier means for amplifying a difference between the voltage signal input from said first input terminal and a lower potential one of the respective voltage signals input by said second and third input means and producing an output, wherein said pulse width modulation control is carried out based on the output of the amplifier means; and capacitor means connected to the third input means of said error amplifier means and providing the reference voltage used as said soft start signal, said reference voltage being changed continuously between zero volts and a rated voltage.

23. A control circuit producing a pulse width modulation control signal for controlling a converter circuit which converts a direct current input voltage to a different, direct current output voltage, comprising:

amplifier means for receiving a first voltage signal corresponding to the direct-current output voltage as a first input, a predetermined reference voltage signal as a second input and a reference voltage signal, used as a soft start signal when a direct-current to direct-current conversion starts, as a third input, and for producing, as an output thereof, a difference signal representing a difference between the first input and a lower potential one of the second and third inputs; and the control circuit means producing the pulse width modulation control signal in accordance with the difference signal output of the amplifier means.

24. A control circuit having an error amplifier for voltage control and controlling a direct-current to direct-current conversion based on a pulse width modulation control, comprising:

a first input terminal inputting a voltage signal corresponding to an output voltage of a result of said direct-current to direct-current conversion;

a second input terminal inputting a predetermined reference voltage signal;

a third input terminal inputting a reference voltage signal used as a soft start signal when a direct-current to direct-current conversion starts; and an error amplifier amplifying a difference between a voltage signal input from said first input terminal and a voltage signal of a lower potential among voltage signals input from said second and third input terminals, said pulse width modulation control being carried out based on an output of the error amplifier.

25. An apparatus for effecting a direct-current to direct-current conversion, comprising:

a control circuit having an error amplifier providing voltage control and controlling direct-current to direct-current conversion based on a pulse width modulation control using an output of the error amplifier, the error amplifier including a first input terminal inputting a voltage signal corresponding to an output voltage of a result of said direct-current to direct-current conversion, a second input terminal inputting a predetermined reference voltage signal and a third input terminal inputting a reference voltage signal used as a soft start signal when a direct-current to direct-current conversion starts, the error amplifier amplifying a difference between a voltage signal input from said first input terminal and a voltage signal of a lower potential among voltage signals input from said second and third input terminals, said pulse width modulation control being carried out based on an output of the error amplifier; and a capacitor connected to the third input terminal and providing the reference voltage used as said soft start signal, said reference voltage being changed continuously between zero volt and a rated voltage.

26. An apparatus for effecting a direct-current to direct-current conversion using a synchronous rectifying control, comprising:

a synchronous rectifying transistor provided between a ground and a line on which an output voltage of a result of said direct-current to direct-current conversion appears and operative to discharge charges corresponding to the output voltage produced by said direct-current to direct-current conversion; and a control circuit controlling an on/off operation of said synchronous rectifying transistor and including a discharging control circuit which turns on said synchronous rectifying transistor when a direct-current to direct-current conversion stops, wherein said control circuit comprises an error amplifier providing voltage control and including a first input terminal for inputting a voltage signal corresponding to the output voltage of a result of said direct-current to direct-current conversion, a second input terminal for inputting a predetermined reference voltage signal and a third input terminal for inputting a reference voltage signal used as a soft start signal when a direct-current to direct-current conversion starts, the error amplifier amplifying a difference between a voltage signal input from said first input terminal and a voltage signal of a lower potential among voltage signals input from said second and third input terminals, the control circuit carrying out the pulse width modulation control based on an output of the amplifier and controlling the on/off operation of said synchronous rectifying transistor, and wherein said apparatus further comprises a capacitor connected to the third input terminal of said error amplifier and providing the reference voltage used as said soft start signal.

27. A control circuit controlling a direct-current to direct-current conversion by pulse width modulation control using an output of an amplifier, the amplifier comprising:

a first input terminal inputting a voltage signal corresponding to an output voltage of said direct-current to direct-current conversion;

a second input terminal inputting a predetermined reference voltage signal;

a third input terminal inputting a reference voltage signal used as a soft start signal when a direct current to direct-current conversion starts; and the amplifier amplifying a difference between the voltage signal input from said first input terminal and a lower potential one of the respective voltage signals input by said second and third input terminals and producing an output, wherein said pulse width modulation control is carried out based on the output of the amplifier.

28. An apparatus, comprising:

a control circuit controlling a direct-current to direct-current conversion by pulse width modulation control using an output of an amplifier, the amplifier further comprising:

a first input terminal inputting a voltage signal corresponding to an output voltage of said direct-current to direct-current conversion, a second input terminal inputting a predetermined reference voltage signal, a third input terminal inputting a reference voltage signal used as a soft start signal when a direct-current to direct-current conversion starts, and the amplifier amplifying a difference between the voltage signal input from said first input terminal and a lower potential one of the respective voltage signals input by said second and third input terminals and producing an output, wherein said pulse width modulation control is carried out based on the output of the amplifier; and a capacitor connected to the third input terminal of said error amplifier and providing the reference voltage used as said soft start signal, said reference voltage being changed continuously between zero volts and a rated voltage.

29. A control circuit producing a pulse width modulation control signal for controlling a converter circuit which converts a direct current input voltage to a different, direct current output voltage, comprising:

an amplifier receiving a first voltage signal corresponding to the direct-current output voltage as a first input, a predetermined reference voltage signal as a second input and a reference voltage signal, used as a soft start signal when a direct-current to direct-current conversion starts, as a third input, and producing, as an output thereof, a difference signal representing a difference between the first input and a lower potential one of the second and third inputs; and the control circuit producing the pulse width modulation control signal in accordance with the difference signal output of the amplifier.

30. A control circuit having an error amplifier for voltage control and controlling a direct-current to direct-current conversion based on a pulse width modulation control using an output of said error amplifier, the error amplifier comprising:

an input terminal for inputting a voltage signal corresponding to an output voltage of a result of said direct-current to direct-current conversion; and an amplifier for amplifying a difference between a voltage signal input from said first input terminal and a reference voltage which gradually rises when said control circuit starts controlling the direct-current to direct-current conversion and becomes a constant value after a constant time, wherein said pulse width modulation control is carried out based on an output of the amplifier.

31. The control circuit as set forth in claim 30, further comprising:

a discharging circuit discharging charges corresponding to the output voltage of a result of said direct-current to direct-current conversion to be input to the first input terminal of said error amplifier when the control circuit stops the direct-current to direct-current conversion.

32. The control circuit as set forth in claim 31, further comprising a unit inputtting a discharging control signal indicating validity or invalidity of the discharging with respect to said discharging circuit, wherein the discharging circuit is operated when the validity of the discharging is indicated.

33. A control circuit controlling a direct-current to direct-current conversion, based on a pulse width modulation control, comprising:

an input terminal inputting a voltage signal corresponding to an output voltage of a result of said direct-current to direct-current conversion;

a reference voltage output unit outputting a reference voltage, said reference voltage gradually rising when said control circuit starts controlling the direct-current to direct-current conversion and becoming a constant value after a constant time; and an amplifier amplifying a difference between the voltage signal input from said input terminal and the reference voltage and outputting the amplified difference for said pulse width modulation control.

34. The control circuit of claim 33, further comprising:

a predetermined reference output unit outputting a predetermined reference voltage signal; and a soft start voltage signal output unit providing a soft start voltage signal, said soft start voltage signal being changed continuously between a zero volt signal and a rated voltage signal;

wherein said reference output unit outputs a voltage signal of a lower potential, relative to said predetermined voltage signal and soft voltage signal, to said amplifier.

35. A control circuit of claim 34, wherein said soft start voltage signal output unit is a capacitor.

36. An apparatus effecting a direct-current to direct-current conversion, comprising:

a soft start voltage signal output unit providing a soft start voltage signal changing continuously between a zero voltage signal and a rated voltage signal; and a control circuit having an error amplifier for voltage control and controlling a direct-current to direct-current conversion based on a pulse width modulation control using an output of said error amplifier, the error amplifier comprising:

an input terminal inputting a voltage signal corresponding to an output voltage of a result of said direct-current to direct-current conversion, a reference output unit receiving said soft start voltage signal and producing a reference voltage by using said received soft voltage signal, said reference voltage gradually rising when said control circuit starts controlling the direct-current to direct-current conversion and becoming a constant value after a constant time, and an amplifier amplifying a difference between a voltage signal input from said first input terminal and said reference voltage.

37. The apparatus as set forth in claim 36, further comprising a plurality of said control circuits and a plurality of said soft start voltage signal output units, each corresponding to a respective control circuit.

38. The apparatus as set forth in claim 37, wherein said plurality of soft start voltage signal output units comprise plural capacitors having respective, different capacitance values.

39. The apparatus as set forth in claim 38, wherein the respective capacitance values of said plurality of capacitors are set to be sequentially smaller, according to a turn-on sequence of respective power supplies to said plurality of control circuits.

40. The apparatus as set forth in claim 36, further comprising a plurality of said control circuits sharing said soft start voltage signal output unit.

41. The apparatus as set forth in claim 40, wherein:

said soft start voltage signal output unit is a capacitor; and the rise times of respective output current conversions, controlled by said plurality of control circuits, are controlled based on a time constant determined by a capacitance value of the capacitor.

\* \* \* \* \*

UNITED STATES PATENT AND TRADEMARK OFFICE
CERTIFICATE OF CORRECTION

PATENT NO. : 6,147,477
DATED : November 14, 2000
INVENTOR(S) : Mitsuo Saeki et al.

It is certified that error appears in the above-identified patent and that said Letters Patent is hereby corrected as shown below:

On the title page, [56] References Cited. U.S. Patent Documents, add reference --4,672,303 06/1987 Newton 232/283--.

Signed and Sealed this

Twelfth Day of June, 2001

*Attest:*

*Nicholas P. Godici*

*Attesting Officer*

NICHOLAS P. GODICI
*Acting Director of the United States Patent and Trademark Office*